United States Patent
Ehsani et al.

(10) Patent No.: US 12,067,041 B1
(45) Date of Patent: Aug. 20, 2024

(54) TIME SERIES DATA TO STATISTICAL NATURAL LANGUAGE INTERACTION

(71) Applicant: Armada Systems, Inc., San Francisco, CA (US)

(72) Inventors: Sina Ehsani, Seattle, WA (US); Pragyana K. Mishra, Seattle, WA (US)

(73) Assignee: Armada Systems, Inc., San Francisco, CA (US)

( * ) Notice: Subject to any disclaimer, the term of this patent is extended or adjusted under 35 U.S.C. 154(b) by 0 days.

(21) Appl. No.: 18/482,831

(22) Filed: Oct. 6, 2023

(51) Int. Cl.
*G06F 40/30* (2020.01)
*G06F 16/34* (2019.01)
*G06F 40/40* (2020.01)

(52) U.S. Cl.
CPC ............ *G06F 16/345* (2019.01); *G06F 40/40* (2020.01)

(58) Field of Classification Search
CPC .... G06F 40/211; G06F 40/253; G06F 40/268; G06F 40/284; G06F 40/30; G06N 3/08
See application file for complete search history.

(56) References Cited

U.S. PATENT DOCUMENTS

| | | | |
|---|---|---|---|
| 10,419,106 B1 | 9/2019 | Liu et al. | |
| 10,438,094 B1 | 10/2019 | Ko et al. | |
| 10,657,461 B2 | 5/2020 | McMahan et al. | |
| 10,810,193 B1 * | 10/2020 | Subramanya | G06F 16/245 |
| 11,238,849 B1 | 2/2022 | Mimassi | |
| 11,550,997 B2 * | 1/2023 | Song | G06F 40/20 |
| 11,743,344 B1 | 8/2023 | Sivaswamy et al. | |
| 2002/0152206 A1 * | 10/2002 | Gusler | G06F 16/334 |
| | | | 707/999.005 |
| 2005/0283473 A1 * | 12/2005 | Rousso | G06F 16/3322 |
| | | | 707/999.005 |
| 2014/0081982 A1 * | 3/2014 | Hung | G06F 16/313 |
| | | | 707/769 |
| 2015/0120749 A1 | 4/2015 | Phanishayee et al. | |

(Continued)

FOREIGN PATENT DOCUMENTS

| | | |
|---|---|---|
| EP | 0611500 B1 | 7/1999 |
| WO | 2019112667 A1 | 6/2019 |

OTHER PUBLICATIONS

Gupta et al., "Using Closed Captions to Train Activity Recognizers that Improve Video Retrieval", 2009 IEEE Computer Society Conference on Computer Vision and Pattern Recognition (Year: 2009).

(Continued)

*Primary Examiner* — Lamont M Spooner
(74) *Attorney, Agent, or Firm* — Athorus, PLLC

(57) ABSTRACT

Disclosed implementations include systems, methods, and apparatus that process multiple, disparate streams of data, determine correlations and relationships between the data and provide natural language responses that provide insights for events or activities that have occurred and foresights for events or activities that are forecasted to occur. The disclosed implementations include a model that understands data statistics and provides both insights and foresights that are backed with statistical support that can be presented to and understood by operators. Still further, the disclosed implementations are capable of operating at edge locations that may be frequently or permanently disconnected from conventional or cloud based systems.

20 Claims, 25 Drawing Sheets

(56) References Cited

U.S. PATENT DOCUMENTS

| | | | |
|---|---|---|---|
| 2016/0110433 A1* | 4/2016 | Sawhney | G06F 40/30 |
| | | | 707/722 |
| 2016/0275945 A1* | 9/2016 | Elisha | G06F 16/638 |
| 2017/0221072 A1 | 8/2017 | AthuluruTlrumala et al. | |
| 2017/0364539 A1 | 12/2017 | Jacob et al. | |
| 2018/0032915 A1 | 2/2018 | Nagaraju et al. | |
| 2018/0341720 A1 | 11/2018 | Bhatia et al. | |
| 2019/0087960 A1 | 3/2019 | Jang et al. | |
| 2019/0138925 A1* | 5/2019 | Park | G06F 3/011 |
| 2019/0156246 A1 | 5/2019 | Kuo et al. | |
| 2019/0210742 A1 | 7/2019 | Satak et al. | |
| 2019/0369984 A1* | 12/2019 | Malladi | H04L 12/2823 |
| 2019/0370686 A1 | 12/2019 | Pezzillo et al. | |
| 2020/0027033 A1 | 1/2020 | Garg et al. | |
| 2020/0065966 A1 | 2/2020 | Spencer et al. | |
| 2020/0136994 A1 | 4/2020 | Doshi et al. | |
| 2020/0160207 A1 | 5/2020 | Song et al. | |
| 2020/0184012 A1 | 6/2020 | Stoyanovsky et al. | |
| 2020/0198739 A1 | 6/2020 | Sheldon-Coulson et al. | |
| 2020/0267053 A1 | 8/2020 | Zheng et al. | |
| 2020/0327371 A1* | 10/2020 | Sharma | G06N 3/08 |
| 2020/0374974 A1 | 11/2020 | Sun et al. | |
| 2020/0379805 A1 | 12/2020 | Porter et al. | |
| 2020/0401891 A1 | 12/2020 | Xu et al. | |
| 2021/0034677 A1 | 2/2021 | Lee et al. | |
| 2021/0350125 A1* | 11/2021 | Arvela | G06V 30/418 |
| 2021/0382923 A1 | 12/2021 | Gragnani et al. | |
| 2021/0397790 A1* | 12/2021 | Arvela | G06F 40/284 |
| 2021/0406306 A1 | 12/2021 | Ambwani et al. | |
| 2022/0004545 A1* | 1/2022 | Arvela | G06F 40/205 |
| 2022/0019422 A1 | 1/2022 | Anderson | |
| 2022/0019422 A1 | 1/2022 | Bhamidipaty | G06N 5/022 |
| 2022/0035878 A1 | 2/2022 | Sarah et al. | |
| 2022/0060455 A1 | 2/2022 | Rosenstein et al. | |
| 2022/0150125 A1 | 5/2022 | Kumar et al. | |
| 2022/0207240 A1* | 6/2022 | Björkqvist | G06F 3/0484 |
| 2022/0292123 A1 | 9/2022 | Hoppe | |
| 2022/0345518 A1 | 10/2022 | Sgobba et al. | |
| 2022/0405484 A1 | 12/2022 | Kanchibhotla et al. | |
| 2023/0021216 A1 | 1/2023 | Shilawat et al. | |
| 2023/0214679 A1 | 7/2023 | Xu et al. | |
| 2023/0222454 A1* | 7/2023 | Cella | G06N 7/01 |
| | | | 705/28 |
| 2023/0222531 A1* | 7/2023 | Cella | G06Q 10/06315 |
| | | | 705/7.31 |
| 2023/0244934 A1 | 8/2023 | Lazaridou et al. | |
| 2023/0267126 A1 | 8/2023 | Frieder et al. | |
| 2023/0267267 A1 | 8/2023 | Sukla | |
| 2023/0291691 A1 | 9/2023 | Edelson et al. | |
| 2023/0300195 A1 | 9/2023 | Sharma et al. | |
| 2023/0315766 A1 | 10/2023 | Cho et al. | |
| 2023/0351112 A1* | 11/2023 | Ozaki | G06F 40/205 |
| 2023/0359825 A1 | 11/2023 | Ramsl | |
| 2023/0368322 A1 | 11/2023 | O'Neill et al. | |

OTHER PUBLICATIONS

Kulkarni et al., "BabyTalk: Understanding and Generating Simple Image Descriptions", IEEE Transactions on Pattern Analysis and Machine Intelligence, vol. 35, No. 12, Dec. 2013 (Year: 2013).

Hsu, Tz-Heng, Zhi-Hao Wang, and Aaron Raymond See, "A cloud-edge-smart IoT architecture for speeding up the deployment of neural network models with transfer learning techniques." Electronics 11.14: 2255. (Year: 2002).

Wang, Hao, et al.; "Optimizing federated learning on non-iid data with reinforcement learning." IEEE INFOCOM 2020—IEEE Conference in Computer Communications. IEEE (Year: 2020).

Wang, Nan, et al., "ENORM: a framework for edge node resource management." IEEE transactions on services computing 13.6: 1086-1099. (Year: 2017).

Brown, Tom B., et al. "Language models are few-shot learners." Advances in Neural Information Processing Systems 33 (2020): 1877-1901.

Devlin, J. et al., 2018, BERT: Pre-training of Deep Bidirectional Transformers for Language Understanding. CoRR abs/1810.04805 (2018), arXiv:1810.04805, Retrieved: https://arxiv.org/pdf/1810.04805v1.pdf, 14 pages.

Dinh, T., et al. 2022. LIFT: Language-interfaced fine-tuning for non-language machine learning tasks. Advances in Neural Information Processing Systems 35 (2022), 11763-11784. URL: https://proceedings.neurips.cc/paper_files/paper/2022/file/4ce7fe1d2730f53cb3857032952cd1b8-Paper-Conference.pdf.

Gong, Heng, Wei Bi, Xiaocheng Feng, Bing Qin, Xiaojiang Liu, and Ting Liu. 2020. Enhancing content planning for table-to-text generation with data understanding and verification. In Findings of the Association for Computational Linguistics: EMNLP 2020. 2905-2914. URL: https://aclanthology.org/2020.findings-emnlp.262.pdf.

Goodfellow, Ian, Jean Pouget-Abadie, Mehdi Mirza, Bing Xu, David Warde-Farley, Sherjil Ozair, Aaron Courville, and Yoshua Bengio. "Generative adversarial nets." Advances in Neural Information Processing Systems 27 (2014). URL: https://proceedings.neurips.cc/paper_files/paper/2014/file/5ca3e9b122f61f8f06494c97b1afccf3-Paper.pdf.

Huang, L., et al. Armada: A Robust Latency-Sensitive Edge Cloud in Heterogeneous Edge-Dense Environments. arXiv:2111.12002 [cs.DC] Nov. 23, 2021. URL: https://arxiv.org/pdf/2111.12002.pdf, 13 pages.

Huang, Lei. "Armada: a robust latency-sensitive edge cloud in heterogeneous edge-dense environments." PhD diss., University of Minnesota, 2021, 55 pages.

Hunter, John D. "Matplotlib: a 2D graphics environment." Computing in Science & Engineering 9, No. 3 (2007), 90-95. URL: https://doi.org/10.1109/MCSE.2007.55.

Jagadish, Hosagrahar V., Johannes Gehrke, Alexandros Labrinidis, Yannis Papakonstantinou, Jignesh M Patel, Raghu Ramakrishnan, and Cyrus Shahabi. "Big data and its technical challenges." Communications of the ACM 57, No. 7 (2014), 86-94. URL: https://citeseerx.ist.psu.edu/document? repid=rep1&type=pdf&doi=e527d3c3d02f3493097be0d0f190bdc322c7519b.

Konstas, Ioannis, Srinivasan Iyer, Mark Yatskar, Yejin Choi, and Luke Zettlemoyer. "Neural AMR: Sequence-to-sequence models for parsing and generation." arXiv preprint arXiv:1704.08381 (2017) URL: https://arxiv.org/pdf/1704.08381.pdf.

Li, Xiang Lisa and Percy Liang. "Prefix-tuning: Optimizing continuous prompts for generation." arXiv preprint arXiv:2101.00190 (2021). URL: https://arxiv.org/pdf/2101.00190.pdf.

Liu, Tianyu, Fuli Luo, Pengcheng Yang, Wei Wu, Baobao Chang, and Zhifang Sui. "Towards comprehensive description generation from factual attribute-value tables." In Proceedings of the 57th Annual Meeting of the Association for Computational Linguistics. 5985-5996. 2019. URL: https://aclanthology.org/P19-1600.pdf.

Luketina, Jelena, Nantas Nardelli, Gregory Farquhar, Jakob Foerster, Jacob Andreas, Edward Grefenstette, Shimon Whiteson, and Tim Rocktäschel. "A survey of reinforcement learning informed by natural language." arXiv preprint arXiv:1906.03926 (2019). URL: https://arxiv.org/pdf/1906.03926.pdf.

Mager, Manuel, Ramón Fernandez Astudillo, Tahira Naseem, Md Arafat Sultan, Young-Suk Lee, Radu Florian, and Salim Roukos. "GPT-too: a language-model-first approach for AMR-to-text generation." arXiv preprint arXiv:2005.09123 (2020). URL: https://arxiv.org/pdf/2005.09123.pdf.

OPENAI. [n. d.]. Introducing ChatGPT. www.openai.com, OpenAI, L.L.C. Accessed Oct. 17, 2023, URL: https://openai.com/blog/chatgpt/.

OPENAI. GPT-4 Technical Report. OpenAI. arXiv:2303.08774 (2023). URL: https://arxiv.org/pdf/2303.08774.pdf.

Patel, Arkil, Satwik Bhattamishra, and Navin Goyal. "Are NLP models really able to solve simple math word problems?" arXiv preprint arXiv:2103.07191 (2021). URL: https://arxiv.org/pdf/2103.07191.pdf.

Radford, A. et al., 2018, Language Models are Unsupervised Multitask Learners, (2018) Retrieved: https://d4mucfpksywv.cloudfront.net/better-language-models/language_models_are_unsupervised_multitask_learners.pdf, 24 pages.

Ramos, Juan. "Using TF-IDF to determine word relevance in document queries." In Proceedings of the First Instructional Con-

(56) References Cited

OTHER PUBLICATIONS ference on Machine Learning, vol. 242., No. 1, 2003. URL: https://citeseerx.ist.psu.edu/document?_repid=rep1&type=pdf&doi=b3bf6373ff41a115197cb5b30e57830c16130c2c.

Ribeiro, Leonardo F.R., Martin Schmitt, Hinrich Schütze, and Iryna Gurevych. "Investigating pretrained language models for graph-to-text generation." arXiv preprint arXiv:2007.08426 (2020). URL: https://arxiv.org/pdf/2007.08426. pdf.

Sharma, Mandar, Ajay Gogineni and Naren Ramakrishnan. "Innovations in neural data-to-text generation: a Survey." arXiv preprint arXiv:2207.12571 (2022). URL: https://arxiv.org/pdf/2207.12571.pdf.

Song, Kaitao, et al. "MPNet: Masked and Permuted Pre-training for Language Understanding." 34th Conference on Neural Information Processing Systems (NeurIPS 2020), Vancouver, Canada. URL: https://arxiv.org/pdf/2004.09297.pdf.

Sutton, R. S. and Barto, A. G., EM Reinforcement Learning: An Introduction. MIT press, 2018.

Taori, Rohan, Ishaan Gulrajani, Tianyi Zhang, Yann Dubois, Xuechen Li, Carlos Guestrin, Percy Liang, and Tatsunori B Hashimoto. "Alpaca: a strong, replicable instruction-following model." Stanford Center for Research on Foundation Models. URL: https://crfm.stanford.edu/2023/03/13/alpaca.html, 3, No. 6 (2023): 7.

Touvron, Hugo, Louis Martin, Kevin Stone, Peter Albert, Amjad Almahairi, Yasmine Babaei, Nikolay Bashlykov, Soumya Batra, Prajjwal Bhargava, Shruti Bhosale, et al. "LLaMA 2: Open foundation and fine-tuned chat models." arXiv preprint arXiv:2307.09288 (2023). URL: https://arxiv.org/pdf/2307.09288.pdfÂ%C2%A0.

Touvron, Hugo, Thibaut Lavril, Gautier Izacard, Xavier Martinet, Marie-Anne Lachaux, Timothée Lacroix, Baptiste Rozière, Naman Goyal, Eric Hambro, Faisal Azhar, et al. "LLaMA: Open and efficient foundation language models." arXiv preprint arXiv:2302.13971 (2023). URL: https://arxiv.org/pdf/2302.13971.pdf.

Wang, Yizhong, Yeganeh Kordi, Swaroop Mishra, Alisa Liu, Noah A. Smith, Daniel Khashabi, and Hannaneh Hajishirzi. "Self-Instruct: Aligning language models with self-generated instructions." arXiv preprint arXiv:2212.10560 (2022). URL: https://arxiv.org/pdf/2212.10560.pdf.

Zhao, Jianyu, Zhiqiang Zhan, Tong Li, Rang Li, Changjian Hu, Siyun Wang, and Yang Zhang. "Generative adversarial network for Table-to-Text generation." Neurocomputing 452 (2021), 28-36.

\* cited by examiner

TIME SERIES DATA TO STATISTICAL NATURAL LANGUAGE INTERACTION

BACKGROUND

In many existing cloud computing architectures, data generated at endpoints (e.g., mobile devices, Internet of Things ("IoT") sensors, robots, industrial automation systems, security cameras, etc., among various other edge devices and sensors) is transmitted to centralized data centers for processing. The processed results are then transmitted from the centralized data centers to the endpoints requesting the processed results. The centralized processing approach may present challenges for growing use cases, such as for real-time applications and/or artificial intelligence ("AI") and machine learning ("ML") workloads. For instance, centralized processing models and conventional cloud computing architectures can face constraints in the areas of latency, availability, bandwidth usage, data privacy, network security, and the capacity to process large volumes of data in a timely manner.

BRIEF DESCRIPTION OF DRAWINGS

The detailed description is described with reference to the accompanying figures.

DETAILED DESCRIPTION

Described are systems, methods, and apparatus that process multiple, disparate streams of data, determine correlations and relationships between the data and provide natural language responses that provide insights for events or activities that have occurred and foresights for events or activities that are forecasted to occur. As discussed further below, the disclosed implementations include a model, referred to herein as an "edge model," that understands data statistics and provides both insights and foresights that are backed with statistical support that can be presented to and understood by operators. Still further, the disclosed implementations are capable of operating at edge locations that may be frequently or permanently disconnected from conventional or cloud based systems.

As discussed further below, in some implementations, a training dataset, also referred to herein as training data that is used to fine tune an edge model that will operate at an edge location, may be generated using existing models, such as large language models operating on conventional cloud based environments. That training data may then be utilized to fine tune an edge model that will operate on the edge and the edge model may be further tuned for specific data, interaction, etc., that are unique to the edge location.

In still further examples, the edge model may be further configured to provide multiple different workspaces for one or more operators at the edge. Each workspace may consider the same or different sources of data and provide both insights and foresights in natural language and statistically supported outputs. Alerts and notifications that are specific to each workspace, the edge location, and/or one or more data sources, may also be generated and the respective data monitored to determine when a threshold(s) and/or rule(s) for the alert is satisfied (insight) or predicted to be satisfied (foresight) and desired alerts automatically generated. In still other implementations, one or more actions may be automatically performed or initiated upon the occurrence of a detected alert or event. For example, an alert may be generated in which the disclosed implementations monitor weather data and satellite connectivity data between one or more satellites and the edge location and, when one or more defined conditions are satisfied, data is automatically transmitted between the edge location and the one or more satellites.

In some implementations, in addition to or as an alternative to providing statistically supported natural language outputs, one or more statistically based graphs, plots, or other visual representations may be generated and provided as part of the natural language outputs to provide statistical support for the generated output(s). Likewise, the edge model may be trained to generate and provide one or more confidence intervals indicating a confidence that the provided output is accurate (insight) or predicted to occur (foresight).

Figure 1A:
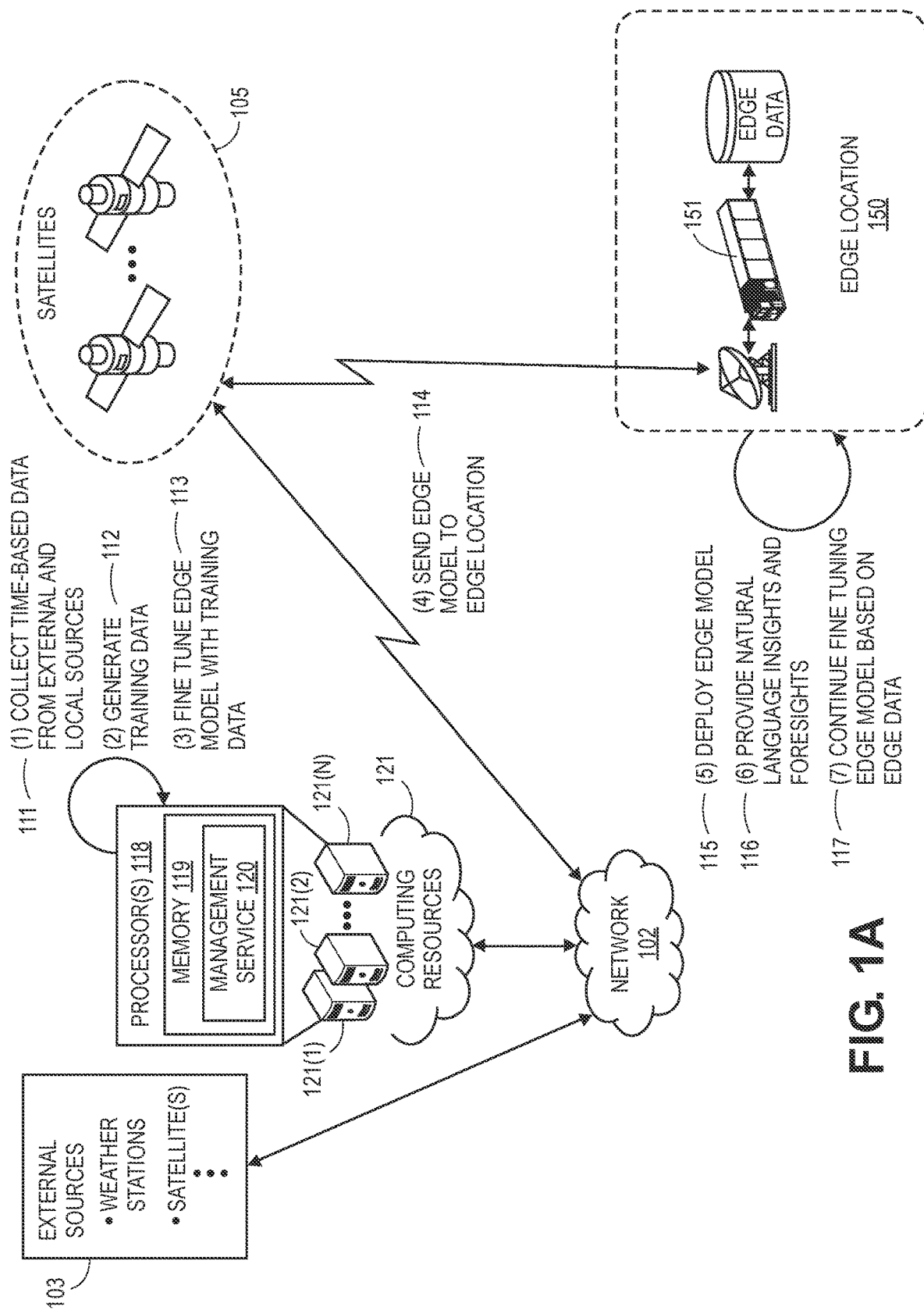
FIG. 1A is a transition diagram illustrating the generation of training data and the training of an edge model that is able to receive multiple disparate streams of time-series data, determine statistical relationships between the data, and provide natural language interaction relating to the data, in accordance with disclosed implementations.

FIG. 1A is a transition diagram illustrating the generation of training data and the training of an edge model that is able to receive multiple disparate streams of time-series data, also referred to herein as time-based data, determine statistical relationships between the data, and provide natural language interaction relating to the data, in accordance with disclosed implementations.

As discussed herein, one or more initial training data sets that may include one or more of tabular data, statistical terms, summary statistics generated from the tabular data, natural language of the summary statistics, and/or input-output pairs ("IO pairs") that are generated based on the tabular data and natural language of the summary statistics may be generated using one or more traditional computing resources 121 upon which a management service 120 is operating. For example, the management service 120 may access or obtain, via the network 102, time-based data, streaming data, etc., such as weather data, satellite data, video camera data, audio data, vibration sensor data, geo-spatial data, and/or any other form of time-based or streamed data from any of a variety of sources 103, as in 111. In addition, in some implementations, historical data from one or more edge locations where an edge model(s) is to be deployed may also be obtained and used with the disclosed implementations to generate the initial training data. Likewise, historical data from other edge locations that may or may not receive an edge model generated with the disclosed implementations may also be obtained and used. As will be appreciated, any source and/or type of existing time-based data may be utilized with the disclosed implementations to generate training data.

The computing resource(s) 121 may be remote from an edge location 150. Likewise, the computing resource(s) 121 may be configured to communicate over a network 102, such as the Internet with other computing resources and/or other networks, such as a satellite network 105.

As illustrated, the computing resource(s) 121 may be implemented as one or more servers 121(1), 121(2), . . . , 121(N) and may, in some instances, form a portion of a network-accessible computing platform implemented as a computing infrastructure of processors, storage, software, data access, and so forth that is maintained and accessible by components/devices of the system via a network 102, such as an intranet (e.g., local area network), the Internet, etc. The server system(s) 121 does not require end-user knowledge of the physical location and configuration of the system that delivers the services. Common expressions for these remote computing resource(s) 121 include "on-demand computing," "software as a service (SaaS)," "platform computing," "network-accessible platform," "cloud services," "data centers," and so forth. Each of the servers 121(1)-(N) include a processor 118 and memory 119, which may store or otherwise have access to a management service 120, as described herein. The management service 120, executing on the computing resources 121 may include or access one or more machine learning ("ML") models or artificial intelligence ("AI") models.

For example, ML and AI models that may operate on conventional computing resources 121 and be executed or accessed by the management service 120 include, but are not limited to deep neural networks ("DNN"s), convolutional neural networks ("CNN"s), region-based CNNs ("R-CNN"s), recurrent neural networks ("RNN"s), long short-term memory ("LSTM") networks, vision transformers ("ViT"s), variational autoencoders ("VAE"s), generative adversarial networks ("GAN"s), autoencoders, transformers, bidirectional encoder representations from transformers ("BERT"), stable diffusion, attention mechanisms, large language models ("LLM"s), etc.

The network 102, and each of the other networks discussed herein, may utilize wired technologies (e.g., wires, USB, fiber optic cable, etc.), wireless technologies (e.g., radio frequency, infrared, NFC, cellular, satellite, Bluetooth, etc.), or other connection technologies. The network 102 is representative of any type of communication network, including data and/or voice network, and may be implemented using wired infrastructure (e.g., cable, CAT6, fiberoptic cable, etc.), a wireless infrastructure (e.g., RF, cellular, microwave, satellite, Bluetooth, etc.), and/or other connection technologies.

The collected time-based data may then be organized, by time, into tabular data that will be included in the training data, as in 112. As will be appreciated, different sources of time based data may be generated at different frequencies and may, from a human perspective, be completely unrelated. In some implementations, some or all of the tabular data may be supplemented with interpretations between time samples to complete the tabular data. For example, if weather data is sampled on five-minute intervals and included in tabular data with satellite latency samples that are sampled at one-minute intervals, the weather data may be supplemented to include synthetically determined samples at each minute between the five minute intervals. For example, a larger portion of the weather samples (e.g., three hours) may be processed to determine a trend line of the weather data and synthetic samples generated based on that trend line to correspond with the sample frequency of the satellite latency samples. As will be appreciated, the sample frequency between different and independent data sources may vary greatly, with some data sources sampling every millisecond and others only sampling hourly, or daily. Accordingly, in some implementations, while time-alignment of the data samples may be performed, synthetic supplementation between samples may or may not be done for each instance of sampled data.

In addition to generating tabular data from historical data obtained from different data sources, in some implementations, synthetic datasets may be generated and included in the initial training data. For example, based on the knowledge of statistical terms (discussed below) that will be used to generate the training data that is utilized to train and fine-tune an edge model(s), synthetic instances of tabular data may be dynamically generated with statistics randomly selected to ensure a diverse representation and to ensure that the dataset is relevant to the edge model(s) that is to be trained. Likewise, to represent the variability between different data sources (e.g., sampling frequency) in real-word data, the synthetic data may differ in dimensions, encompassing a range of row and column counts. Likewise, to better simulate real-world examples, elements of randomness and/or noise may be introduced into the synthetic data thereby generating a larger and more realistic distribution of data and instances of outliers.

Upon receiving and/or generating the tabular data, as part of generating the training data, the tabular data may be processed to generate summary statistics from the tabular data. As discussed further below, this may include commonly used metrics such as mean, median, standard deviation, distribution, distribution parameters, etc. The metrics may be further transformed into confidence interval ranges to provide additional insight into the data's variability. Other statistical measures that may be included in the summary statistics include, but are not limited to, variance, skewness, kurtosis, percentile, mode, bias, standard error expectation, expected value, chi-square statistic, chi-square curve, critical value, margin of error, t-distribution, t-Test, t-score, test statistic, z-text, z-score, Z statistic, statistical significance, significance level, confidence interval, correlation, correlation coefficient, uncorrelated, conditional probability, cumulative probability distribution function, joint probability distribution function, p-value, histogram, unimodal, bimodal, multimodal, normal distribution, gaussian distribution, normal curve, bell curve, Poisson distribution, binomial distribution, Bernoulli distribution, uniform distribution, exponential distribution, geometric distribution, skewed distribution, symmetric distribution, antecedent, consequent, affirming the antecedent, affirming the consequent, dependent variable, dependent random variable, dependent event, maximum likelihood estimate, double-blind, double-blind experiment, confounding, confounding variable, root-mean-square, root-mean-square error, appeal to ignorance, homoscedasticity, heteroscedasticity, longitudinal study, regression, linear regression, regression toward the mean, regression effect, regression fallacy, type I error, type II error, type III error, sampling error, non-sampling error, coverage error, measurement error, discretization error, digitization error, etc.

In some implementations, as discussed further below, visual representations of the tabular data and/or the summary statistics may also be generated and included in the training data. For example, existing systems, such as MATPLOTLIB, may be utilized to generate a variety of plots that juxtapose individual data points with historical tabular data. Such plots may aid in interpretation of data and the identification of data points that deviate from the norm, also known as "outliers" or "abnormalities."

In addition to generating summary statistics for the tabular data as part of generating the training data, the tabular data may be further processed to generate actionable foresights about future data states. For example, and as discussed herein, a hybrid modeling that synergistically combines the strengths of tree-based models and neural networks may be utilized. Tree-based models may serve as a foundational layer, offering both interpretability of the tabular data and the ability to determine non-linear relationships between the different data sources of the tabular data. In parallel, the neural networks enhance the model's predictive power by handling temporal dependencies inherent in sequential (e.g., time-series) data. To improve the reliability of predictions, bootstrapping methods may also be utilized to generate multiple resampled datasets from the original tabular data, facilitating the calculation of a distribution of possible future states. This distribution may be sequentially analyzed to derive confidence intervals, providing a quantifiable measure of the reliability of the predictions. The integration of these diverse modeling techniques and statistical methods enables the generation, in accordance with the disclosed implementations, of foresights with statistical confidence.

Upon generation of the summary statistics from the tabular data, the summary statistics, plots, and predictions, as discussed further below, the summary statistics, plots, and predictions may be linearized to provide a structured and consistent representation of these diverse data forms in a natural language, referred to herein as "natural language summary statistics." The final stage of generating the training data may include generating, based on the natural language summary statistics, multiple different instruction and output pairs ("IO pairs"). As discussed further below, multiple IO pairs may be generated to encompass a wide range of scenarios, from tabular dataset instructions lending to data summaries (e.g., JavaScript Object Notation ("JSON") data summaries), to questions paired with summary statistics yielding specific answers. As discussed below, a comprehensive set of IO pairs may be used to train an edge model for a myriad of different data scenarios, enhancing the versatility and comprehension of the edge model.

The above overview of generating training data, which is discussed further below with respect to FIGS. 5-9, produces training data characterized by its structure representation and versatility. The generated IO pairs, with their inherent multitasking properties, set the stage for subsequent multitasking learning by the edge model(s) to be trained, thereby ensuring that the trained edge models are robust and adaptable across diverse data scenarios, as discussed herein.

The training data may then be used to train or fine-tune the edge model, as in 113. As discussed herein, the edge model may be a smaller machine learning model than was used to generate the training data. For example, model(s) used to generate the training data may be larger LLMs, such as ChatGPT, GPT-4, LLAMA 2, PaLM 2, etc., which are generally large in size, take months or years to train using massive datasets, and require large amount of compute to execute-compute amounts that are not generally available at edge locations. In comparison, the edge model may be a smaller LLM, more recently being referred to as small language models ("SLM"s) such as Q8-Chat, Chinchilla, smaller versions of LLaMA, etc., which are comparatively small in size, are faster to train, and require significantly less computing power, especially when tuned for specific data and/or edge locations.

Figure 3A:
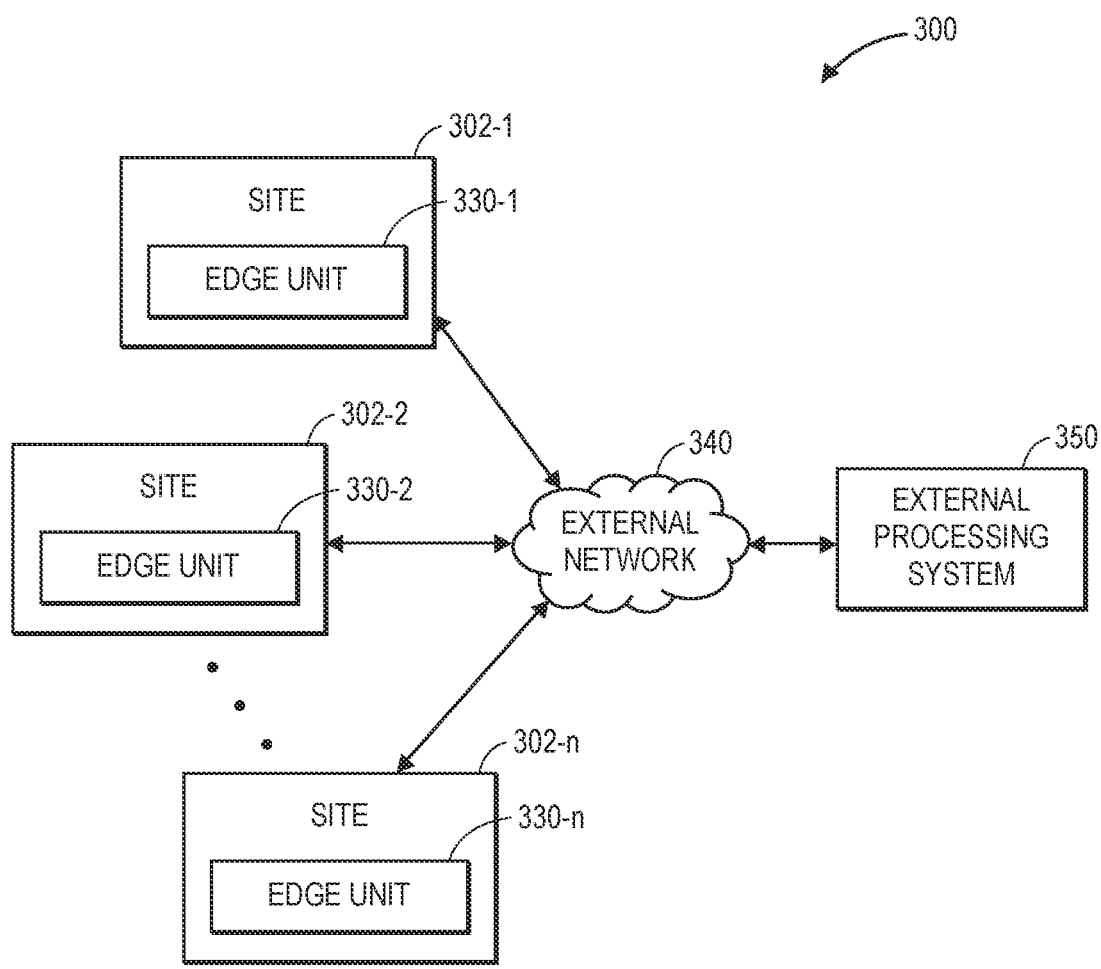
FIGS. 3A and 3B are block diagrams of an example system, in accordance with disclosed implementations.

As illustrated in the example discussed with respect to FIG. 3A, the edge model may be trained or fine-tuned by the management service 120 executing on the computing resources 121, as in 113. Training or fine-tuning of the edge model, as discussed further below, may include, training the edge model with the training data so that the edge model can learn and understand how to (1) determine the summary statistics from received time-series data. (2) determine and understand relationships/causality between different sources of data, (3) generate natural language summary statistics, (4) provide natural language outputs for both insights and foresights relevant to an edge location, (5) generate, monitor, and trigger alerts based on time-series data, etc. In addition to the training data, fine-tuning may also utilize benchmark or known data from the edge location that is specific to the edge location.

Once trained, the edge model may be compressed and sent, for example via a satellite 105 transmission to one or more edge locations 150, as in 114. As discussed below, the edge location may include one or more edge computing units 151, as discussed with respect to FIGS. 2A-4. In other implementations, the edge model may be trained, loaded into memory of an edge computing unit(s) 151 and the edge computing unit(s) 151 may be physically transported, for example via helicopter, and placed at the edge location. In still another example, the edge computing unit(s) 151 may originally be connected to the computing resources 121 and receive the trained edge model before the edge computing unit is disconnected from the computing resources.

The edge model, once received at the edge location may be deployed, as in 115, and provide natural language insights and foresights based on data received and/or generated at the edge location, as in 116, and as discussed further below. For example, the edge model may process time-series weather data, satellite data, etc., and determine why latency between the edge location and one or more satellites has changed (an insight), determine an expected window of time in the future during which data transmission is optimal (a foresight), etc. As another example, the edge model may process drill temperature data, vibration data, etc., and determine recommended drill speeds, drill depths, etc. As will be appreciated, the disclosed implementations of an edge model deployed to an edge location may be tuned with different data to provide insights and/or foresights for any of a wide variety of scenarios, such as, but not limited to, offshore drilling, oil refineries, agriculture, autonomous vehicles, security, media and entertainment, aviation, manufacturing, warehouse automation, robotics, supply chain logistics, fulfillment, sustainability, healthcare, etc. In some implementations the data used to tune the edge model may be obtained from the edge location at which the edge model is deployed, from another edge location that has similar characteristics to the edge location, another edge location controlled or operated by the same operator/user/business, etc.

As the edge model is executing at the edge location, the edge model may continuously or periodically fine tune and train based on data received and/or generated at the location and events or actions that occur and are recorded at the edge location, as in 117. For example, the edge model may predict a latency at a point in time in the future based on forecasted humidity, cloud cover, pressure, etc., and subsequently learn an error or difference between the prediction and the actual latency when the conditions occurred. Such information and knowledge may be provided back to the edge model to further refine and tune the edge model. As discussed herein, operation of the edge model to provide natural language insights and/or foresights, as well as ongoing training or tuning of the edge model may be done entirely at the edge location without the need for interaction with other models or other computing resources. Indeed, as discussed herein, the edge location may be continually or periodically disconnected from some or all outside sources and the edge model may rely and operate solely on time-series data generated by sensors and/or other devices at the edge location. Not only do the described implementations enablement and ongoing tuning of an edge model at a remote location, with the disclosed implementations, sensitive data (e.g., company trade secrets, personnel information, edge location specific information, etc.) can be provided to and used by the edge model without concern of a security breach—because the edge model may be disconnected from sources beyond the edge location and still be fully operational.

Figure 1B:
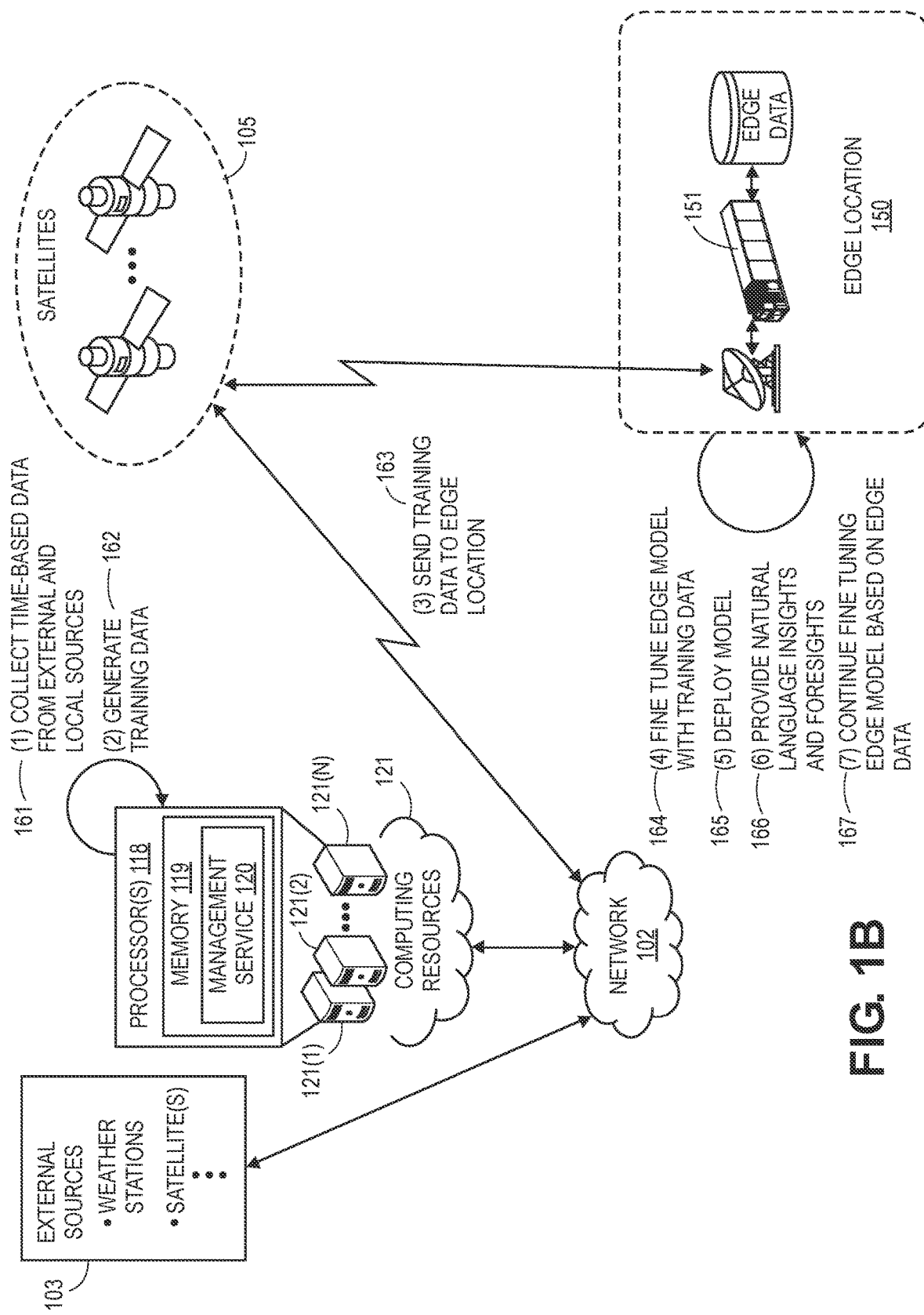
FIG. 1B is another transition diagram illustrating the generation of training data and the training of an edge model that is able to receive multiple disparate streams of time-series data, determine statistical relationships between the data, and provide natural language interaction relating to the data, in accordance with disclosed implementations.

FIG. 1B is another transition diagram illustrating the generation of training data and the training of an edge model that is able to receive multiple disparate streams of time-series data, determine statistical relationships between the data, and provide natural language interaction relating to the data, in accordance with disclosed implementations.

As discussed herein, one or more initial training data sets that may include one or more of tabular data, statistical terms, summary statistics generated from the tabular data, natural language of the summary statistics, and/or IO pairs that are generated based on the tabular data and natural language of the summary statistics may be generated using one or more traditional computing resources 121 upon which a management service 120 is operating. For example, the management service 120 may access or obtain, via the network 102, time-based data, streaming data, etc., such as weather data, satellite data, video camera data, audio data, vibration sensor data, geospatial data, and/or any other form of time-based or streamed data from any of a variety of sources 103, as in 161. In addition, in some implementations, historical data from one or more edge locations where an edge model(s) is to be deployed may also be obtained and used with the disclosed implementations to generate the initial training data. Likewise, historical data from other edge locations that may or may not receive an edge model generated with the disclosed implementations may also be obtained and used. As will be appreciated, any source and/or type of existing time-based data may be utilized with the disclosed implementations to generate training data.

The collected time-based data may then be organized, by time, into tabular data that will be included in the training data, as in 162. As will be appreciated, different sources of time based data may be generated at different frequencies and may, from a human perspective, be completely unrelated. In some implementations, some or all of the tabular data may be supplemented with interpretations between time samples to complete the tabular data. For example, if weather data is sampled on five-minute intervals and included in tabular data with satellite latency samples that are sampled at one-minute intervals, the weather data may be supplemented to include synthetically determined samples at each minute between the five minute intervals. For example, a larger portion of the weather samples (e.g., three hours) may be processed to determine a trend line of the weather data and synthetic samples generated based on that trend line to correspond with the sample frequency of the satellite latency samples. As will be appreciated, the sample frequency between different and independent data sources may vary greatly, with some data sources sampling every millisecond and others only sampling hourly, or daily. Accordingly, in some implementations, while time-alignment of the data samples may be performed, synthetic supplementation between samples may or may not be done for each instance of sampled data.

In addition to generating tabular data from historical data obtained from different data sources, in some implementations, synthetic datasets may be generated and included in the initial training data. For example, based on the knowledge of statistical terms (discussed below) that will be used to generate the training data that is utilized to train and fine-tune an edge model(s), synthetic instances of tabular data may be dynamically generated with statistics randomly selected to ensure a diverse representation and to ensure that the dataset is relevant to the edge model(s) that is to be trained. Likewise, to represent the variability between different data sources (e.g., sampling frequency) in real-word data, the synthetic data may differ in dimensions, encompassing a range of row and column counts. Likewise, to better simulate real-world examples, elements of randomness and/or noise may be introduced into the synthetic data thereby generating a larger and more realistic distribution of data and instances of outliers.

Upon receiving and/or generating the tabular data, as part of generating the training data, the tabular data may be processed to generate summary statistics from the tabular data. As discussed herein, this may include any of a variety of statistical measures or metrics.

In some implementations, as discussed further below, visual representations of the tabular data and/or the summary statistics may also be generated and included in the training data. For example, existing systems, such as MATPLOTLIB, may be utilized to generate a variety of plots that juxtapose individual data points with historical tabular data. Such plots may aid in interpretation of data and the identification of data points that deviate from the norm, also known as "outliers" or "abnormalities."

In addition to generating summary statistics for the tabular data as part of generating the training data, the tabular data may be further processed to generate actionable foresights about future data states. For example, and as discussed herein, a hybrid modeling that synergistically combines the strengths of tree-based models and neural networks may be utilized. Tree-based models may serve as a foundational layer, offering both interpretability of the tabular data and the ability to determine non-linear relationships between the different data sources of the tabular data. In parallel, the neural networks enhance the model's predictive power by handling temporal dependencies inherent in sequential (e.g., time-series) data. To improve the reliability of predictions, bootstrapping methods may also be utilized to generate multiple resampled datasets from the original tabular data, facilitating the calculation of a distribution of possible future states. This distribution may be sequentially analyzed to derive confidence intervals, providing a quantifiable measure of the reliability of the predictions. The integration of these diverse modeling techniques and statistical methods enables the generation, in accordance with the disclosed implementations, of foresights with statistical confidence.

Upon generation of the summary statistics from the tabular data, the summary statistics, plots, and predictions, as discussed further below, the summary statistics, plots, and predictions may be linearized to provide a structured and consistent representation of these diverse data forms in a natural language, referred to herein as "natural language summary statistics." The final stage of generating the training data may include generating, based on the natural language summary statistics, multiple different IO pairs. As discussed further below, multiple IO pairs may be generated to encompass a wide range of scenarios, from tabular dataset instructions lending to data summaries (e.g., JSON data summaries), to questions paired with summary statistics yielding specific answers. As discussed below, a comprehensive set of IO pairs may be used to train an edge model for a myriad of different data scenarios, enhancing the versatility and comprehension of the edge model.

The above overview of generating training data, which is discussed further below with respect to FIGS. 5-9, produces training data characterized by its structure representation and versatility. The generated IO pairs, with their inherent multitasking properties, set the stage for subsequent multitasking learning by the edge model(s) to be trained, thereby ensuring that the trained edge models are robust and adaptable across diverse data scenarios, as discussed herein.

In the example illustrated in FIG. 1B, the training data may then be sent to the edge location 150 for use in fine tuning or training the edge model, as in 163. For example, the training data may be transmitted from the computing resources 121, for example via a satellite 105 transmission, to one or more edge locations 150. As discussed below, the edge location may include one or more edge computing units 151, as discussed with respect to FIGS. 2A-4. In other implementations, the training data may be loaded into a portable memory, transported to the edge location, and transferred into the edge location.

Figure 3B:
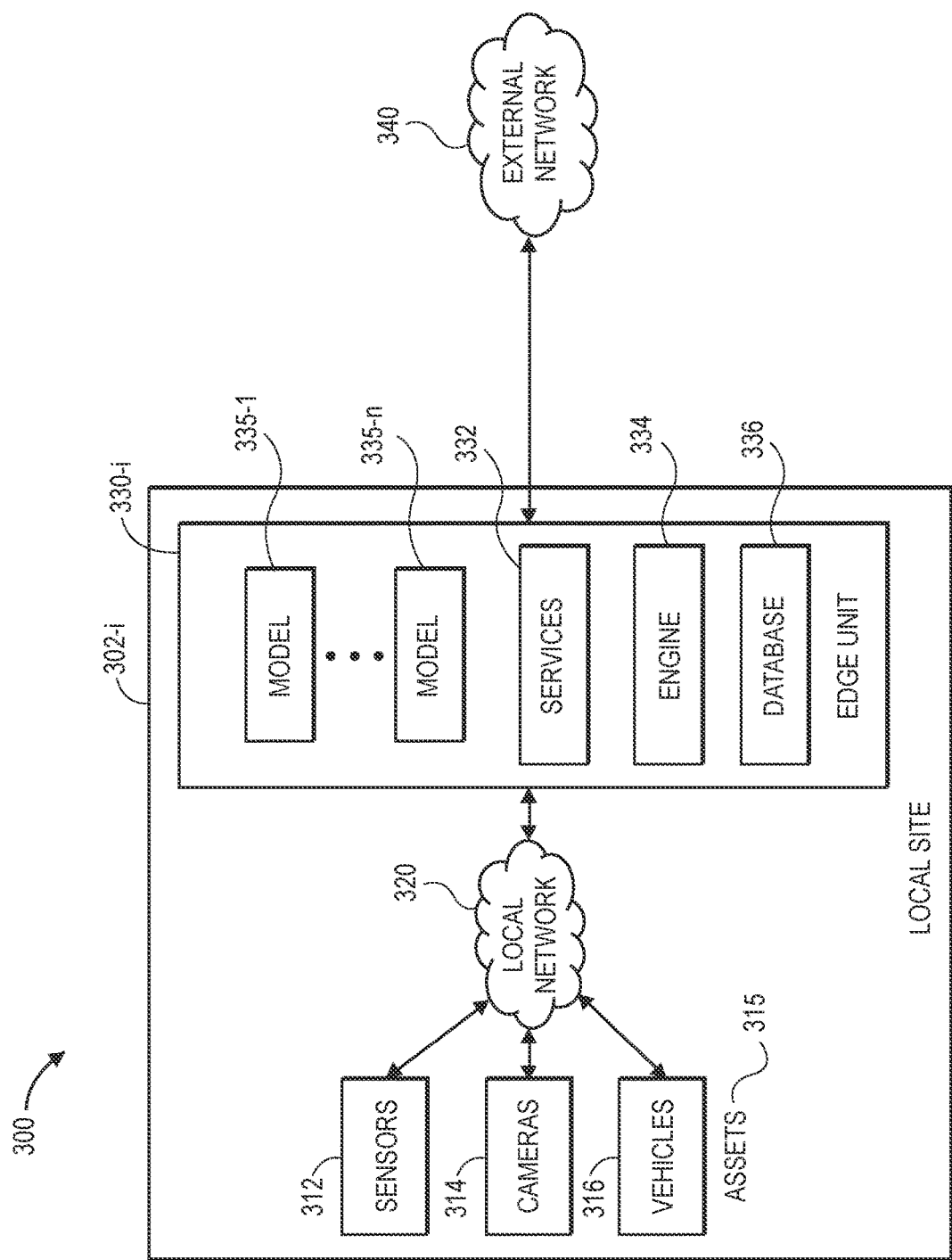

As illustrated in the example discussed with respect to FIG. 3B, the edge model may be trained or fine-tuned at the edge location, as in 164. Training or fine-tuning of the edge model, as discussed further below, may include, training the edge model with the training data so that the edge model can learn and understand how to (1) determine the summary statistics from received time-series data, (2) determine and understand relationships/causality between different sources of data. (3) generate natural language summary statistics, (4) provide natural language outputs for both insights and foresights relevant to an edge location, (5) generate, monitor, and trigger alerts based on time-series data, etc. In addition to the training data, fine-tuning may also utilize benchmark or known data from the edge location that is specific to the edge location.

The edge model, once trained at the edge location may be deployed, as in 165, and provide natural language insights and foresights based on data received and/or generated at the edge location, as in 166, and as discussed further below. For example, the edge model may process time-series weather data, satellite data, etc., and determine why latency between the edge location and one or more satellites has changed (an insight), determine an expected window of time in the future during which data transmission is optimal (a foresight), etc. As another example, the edge model may process drill temperature data, vibration data, etc., and determine recommended drill speeds, drill depths, etc. As will be appreciated, the disclosed implementations of an edge model deployed to an edge location may be tuned with different data to provide insights and/or foresights for any of a wide variety of scenarios, such as, but not limited to, offshore drilling, oil refineries, agriculture, autonomous vehicles, security, media and entertainment, aviation, manufacturing, warehouse automation, robotics, supply chain logistics, fulfillment, sustainability, healthcare, etc. In some implementations the data used to tune the edge model may be obtained from the edge location at which the edge model is deployed, from another edge location that has similar characteristics to the edge location, another edge location controlled or operated by the same operator/user/business, etc.

As the edge model is executing at the edge location, the edge model may continuously or periodically fine tune and train based on data received and/or generated at the location and events or actions that occur and are recorded at the edge location, as in 167. For example, the edge model may predict a latency at a point in time in the future based on forecasted humidity, cloud cover, pressure, etc., and subsequently learn an error or difference between the prediction and the actual latency when the conditions occurred. Such information and knowledge may be provided back to the edge model to further refine and tune the edge model. As discussed herein, operation of the edge model to provide natural language insights and/or foresights, as well as ongoing training or tuning of the edge model may be done entirely at the edge location without the need for interaction with other models or other computing resources. Indeed, as discussed herein, the edge location may be continually or periodically disconnected from some or all outside sources and the edge model may rely and operate solely on time-series data generated by sensors and/or other devices at the edge location. Not only do the described implementations enablement and ongoing tuning of an edge model at a remote location, with the disclosed implementations, sensitive data (e.g., company trade secrets, personnel information, edge location specific information, etc.) can be provided to and used by the edge model without concern of a security breach—because the edge model may be disconnected from sources beyond the edge location and still be fully operational.

Figure 2A:
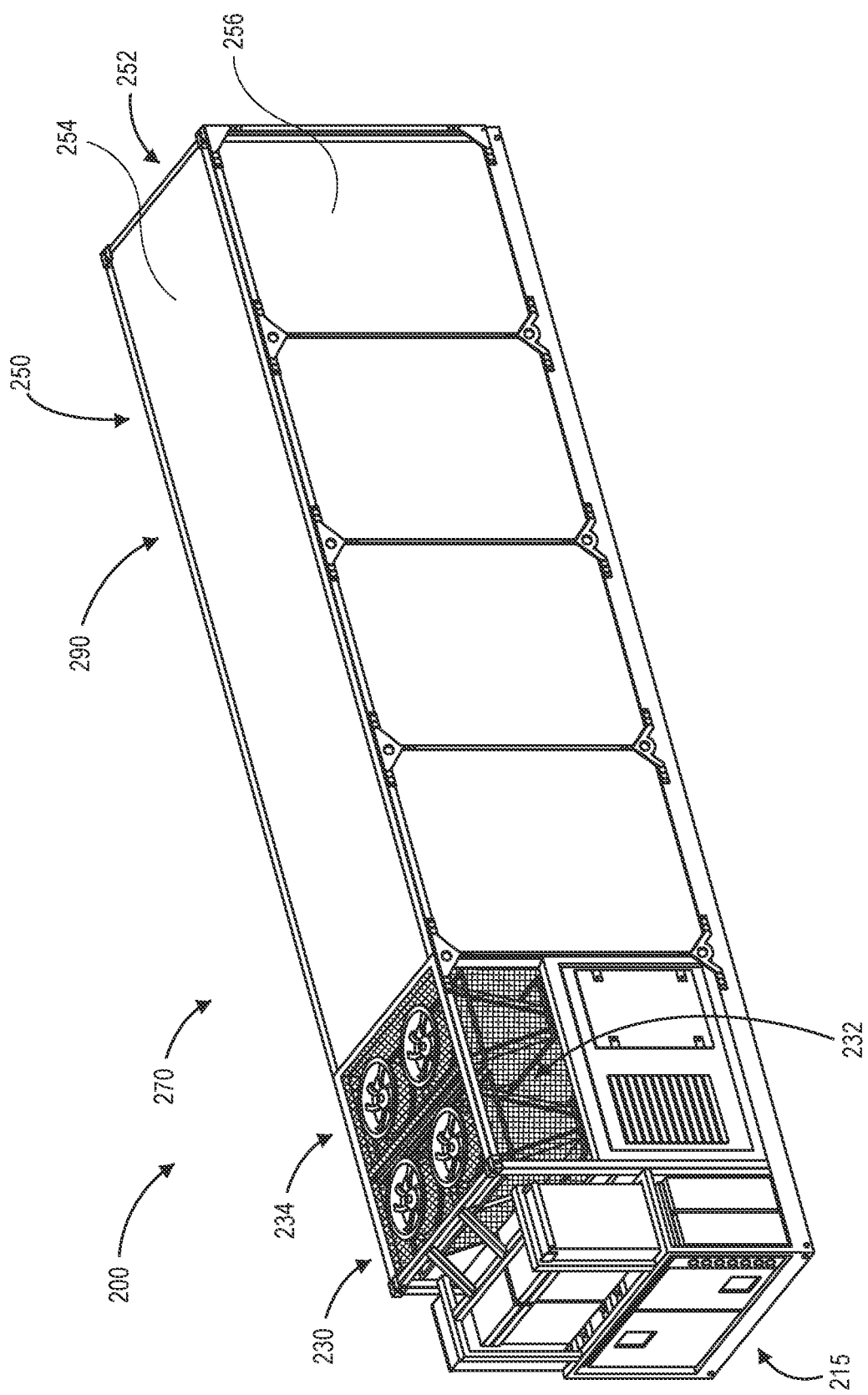
FIGS. 2A and 2B are example illustrations of an edge computing apparatus, in accordance with disclosed implementations.
Figure 2B:
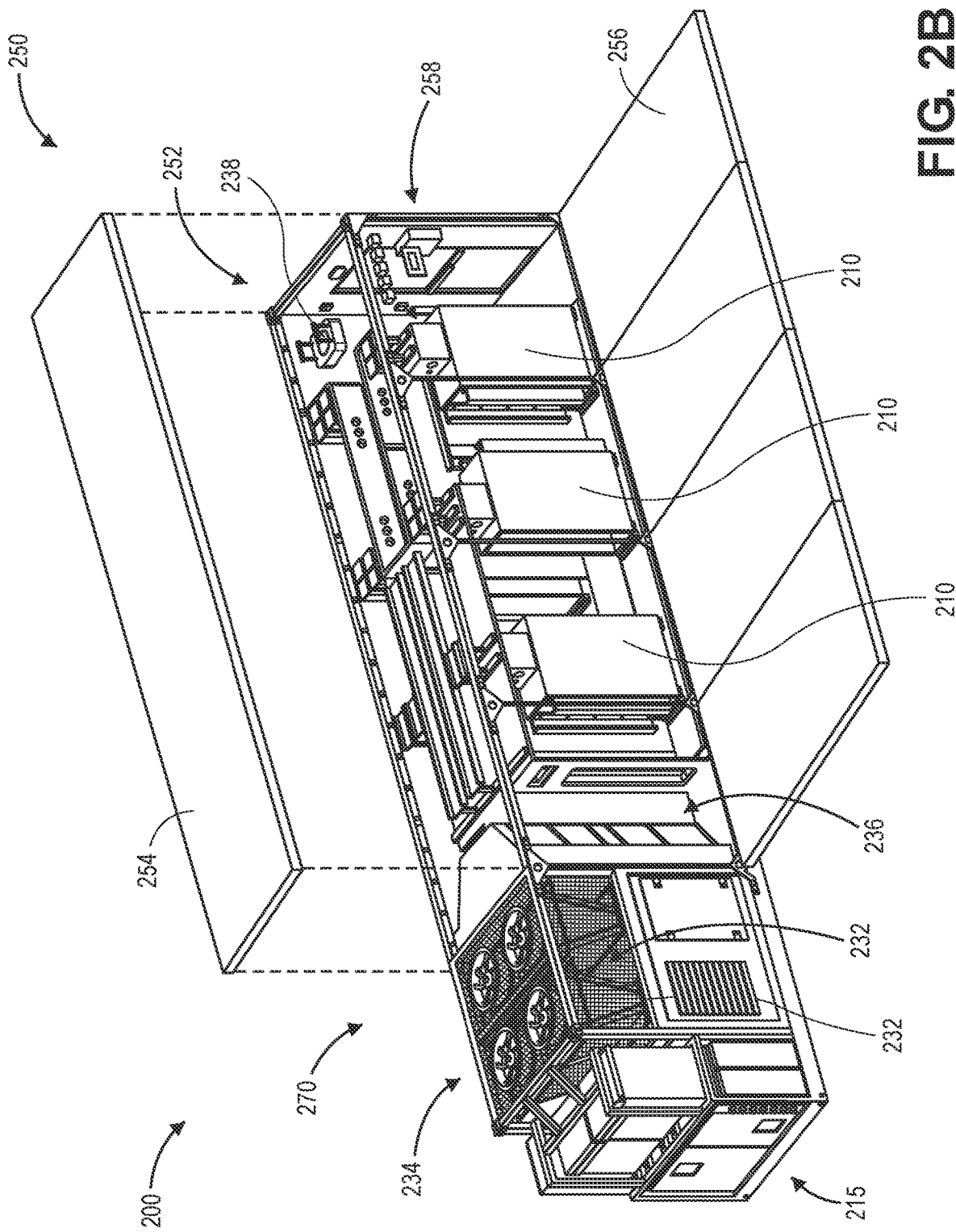

Edge computing units of the present disclosure may have any size, shape or dimensions, and may include any number of components or systems. Referring to FIGS. 2A and 2B, an edge computing apparatus 200 of the present disclosure is shown. As is shown in FIGS. 2A and 2B, the edge computing apparatus 200 comprises a plurality of server racks 210, a plurality of power units 215, a plurality of environmental control systems 230 and an isolation system 250 disposed in a housing 270 having a form of a containerized unit 290. The edge computing apparatus 200 may be deployed to particular sites or locations, which may be referred to herein as "local sites" or "edge locations," using one or more external propulsion units such as helicopters, road tractors, ships, trailers, trains, or others, which may be configured to lift, carry or otherwise transport the edge computing apparatus 200 to such locations, e.g., over substantially long distances. Alternatively, the edge computing apparatus 200 may further include propulsion units that are integrated with the edge computing apparatus 200, such as motors, engines, drive train components, transmissions, axles, wheels or other features. For example, in some implementations, the edge computing apparatus 200 may be an integral component of a road tractor, a trailer or a train. In some implementations, the edge computing apparatus 200 may further include one or more internal propulsion systems, e.g., electrical motors, which may be used to subsequently move or relocate the edge computing apparatus 200 for short distances upon an arrival at a local site or an edge location.

The server racks 210 may include any number of computing components, units or systems. For example, in some implementations, each of the server racks may include one or more central processing units, as well as data stores or other memory components, networking systems, power supplies, high-performance computing units, e.g., graphical processing units, field programmable gate arrays, vision processing units, associative processing units, tensor processing units, neuromorphic chips, quantum processing units, or the like. Numbers of the respective processor units or other components within each of the server racks 210 may be selected for redundancy or for resiliency, or on any other basis. Moreover, the networking systems may include one or more routers, networking switches, out-of-band switches, or systems for communication between the respective server racks 210 or any number of components of the edge computing apparatus 200 within the housing 270, or for communication with any number of external systems (not shown).

The edge computing apparatus 200 may further include one or more power units 215, which may include any number of components for generating or storing energy in any form. For example, in some implementations, the power units 215 may include any number of batteries or other power cells, e.g., dry cell or wet cell batteries such as lead-acid batteries, lithium-ion batteries, nickel cadmium batteries or nickel metal hydride batteries, or any other type, size or form of batteries. In some implementations, the power units 215 may further include one or more diesel engines, electric engines, or engines or motors that are powered by any other source of energy, e.g., gasoline, natural gas, fuel cells, nuclear reactors, solar power, or others. The power units 215 of the edge computing apparatus 200 may be selected on any basis, such as their respective peak or mean voltages, peak or mean load currents, charge times, fuel capacities, or other attributes.

In some implementations, the power units 215 may be coupled to one or more solar panel arrays that are included in, coupled to, or otherwise associated with surfaces of the edge computing unit 200. For example, solar panel arrays may be attached to a top surface of the housing 270, or in any other portion of the housing 270. The solar panel arrays may be fixed in position, or foldable, collapsible, or otherwise movable between deployed and stowed positions, and exposed in order to generate electrical power using sunlight incident upon surfaces of the solar panel arrays. Electrical power generated by solar panel arrays may be transferred to the power units 215 and used to power the edge computing unit 200 and its constituent components.

The edge computing apparatus 200 may further include one or more environmental control systems 230 in order to maintain or establish a desired set of environmental conditions (e.g., temperature, pressure, humidity, or others) within the edge computing apparatus 200. For example, the environmental control systems 230 may include, but need not be limited to, one or more air conditioning units 232, fans 234, dampers 236 and heaters 238. The air conditioning units 232 may be formed from metals, plastics or other suitable materials and include any number of compressors, condensers, evaporators or other systems for maintaining or reducing air temperatures within the edge computing apparatus 200. The environmental control systems 230 may include any number of fans 234 for initiating air flows into the air conditioning units 232 or throughout the housing 270. The environmental control systems 230 may also include one or more dampers 236 for initiating, isolating or regulating flows of air into, throughout or out of the edge computing apparatus 200. The environmental control systems 230 may further include one or more heaters 238 of any type or form, e.g., electric, gas, kerosene, propane, or others, which may include any number of systems for maintaining or increasing air temperatures within the edge computing apparatus 200.

The environmental control systems 230 shown in FIGS. 2A and 2B are integral to the edge computing apparatus 200. Alternatively, or additionally, the edge computing system 200 may include any number of other environmental control systems (not shown) that operate in a standalone manner, external to the edge computing apparatus 200, in order to maintain or establish a desired set of environmental conditions within the edge computing apparatus 200.

As is shown in FIGS. 2A and 2B, the edge computing apparatus 200 may further include an isolation system 250 for isolating internal portions of the edge computing apparatus 200 from an external environment. The isolation system 250 may include a chamber 252 defined by a top cover 254, a plurality of sides 256 and a door 258.

The isolation system 250 may be configured to secure contents of the edge computing apparatus 200, e.g., the server racks 210 or others, and to protect such contents from the elements while also restricting unauthorized access or entry into the chamber 252. For example, the isolation system 250 may be closed and sealed to maintain the chamber 252 in any desired condition, e.g., at selected levels of temperature, pressure and humidity, and access to the chamber 252 may be provided by way of the door 258 following the operation of one or more access control systems, e.g., any remotely activated locking systems for such doors or other portals. Components of the isolation system 250 may have any quality, strength or security ratings. Furthermore, materials from which the cover 254, the sides 256 or the door 258 are formed or constructed may be selected to further provide radiofrequency shielding or to serve other protective functions for contents of the chamber 252.

Components of the isolation system 250 may also serve one or more other purposes, in addition to enclosing and securing portions of the edge computing apparatus 200 and contents of the chamber 252 therein. For example, portions of the isolation system 250 may also provide structural support to the housing 270 or any other portions of the edge computing apparatus 200.

The housing 270 may have any size or shape, and may take any form. In some implementations, the housing 270 may be a shipping container, or a similar vessel, of any standard shape or length. For example, in some implementations, the housing 270 may be a 40-foot vented shipping container constructed from steel and having one or more steel frames and/or castings that are sufficiently durable and strong enough to accommodate cargo, and to withstand impacts due to stacking, shocks or other contact during normal operation. In other implementations, the housing 270 may be made from a non-steel material, which may be appropriate where the containerized units 290 are deployed across wide geographical areas and need not be stacked, enabling lighter and more cost-effective materials other than steel to be used to form the housing 270. Additionally, in some implementations, the housing 270 may take the form of an intermodal container having standard dimensions including widths of approximately eight to eight-and-one-half feet (8 to 8.5 ft) and lengths of twenty, forty, forty-five, forty-eight or fifty-three feet (20, 40, 45, 48 or 53 feet) and heights of approximately eight to ten feet (8 to 10 ft), typically eight-and-one-half or nine-and-one-half feet (8.5 or 9.5 ft).

Implementations of the present disclosure may be operated, performed or executed by any type or form of computing device, apparatus or system, and need not be limited to the edge computing apparatus 200 of FIGS. 2A and 2B. Such devices, apparatuses or systems may include, but need not be limited to, cameras, mobile devices (e.g., smartphones or the like), desktop computers, laptop computers, tablet computers, wearable devices (e.g., glasses or headsets for augmented reality or virtual reality, wrist watches, or others), servers, autonomous vehicles, robotic devices, televisions that may include one or more processors, memory components or data stores, displays, sensors, input/output (or "I/O") devices, or other systems or components that may be configured to execute one or more sets of instructions or commands described herein.

Moreover, the systems and methods described herein may be implemented in electronic hardware, computer software, firmware, or any combination thereof. For example, in some implementations, processes or methods described herein may be operated, performed or executed using computer-readable media having sets of code or instructions stored thereon. Such media may include, but need not be limited to, random-access memory ("RAM") such as synchronous dynamic random-access memory ("SDRAM"), read-only memory ("ROM"), non-volatile random-access memory ("NVRAM"), electrically erasable programmable read-only memory ("EEPROM"), FLASH memory, magnetic or optical data storage media, or others. Alternatively, or additionally, the disclosed implementations may be realized at least in part by a computer-readable communication medium that carries or communicates program code in the form of instructions or data structures and that may be accessed, read, and/or executed by a computer. Additionally, code or instructions may be executed by one or more processors or other circuitry. For example, in some implementations, such components may include electronic circuits or hardware, programmable electronic circuits such as microprocessors, graphics processing units ("GPU"), digital signal processors ("DSP"), central processing units ("CPU") or other suitable electronic circuits, which may be executed or implemented using computer software, firmware, or any combination thereof, to perform the various operations described herein.

Edge computing apparatuses may be provided at any site or location and in any number, and may be connected to one another or any external systems over one or more external networks. Referring to FIGS. 3A and 3B, block diagrams of one system 300 in accordance with implementations of the present disclosure are shown.

As is shown in FIG. 3A, the edge computing system 300 includes a plurality of edge computing units (or systems) 330-1, 330-2 . . . 330-n and an external processing system 350. The plurality of edge computing units 330-1, 330-2 . . . 330-n are distributed at various local sites 302-1, 302-2 . . . 302-n, which may also be referred to herein as "edge locations," and connected to one another and the external processing system 350 over an external network 340, which may include the Internet in whole or in part. Each of the sites 302-1, 302-2 . . . 302-n may include any number of edge computing units 330-1, 330-2 . . . 330-n.

As is shown in FIG. 3B, a representative one of the sites 302-1, 302-2 . . . 302-n including a representative one of the edge computing units 330-1, 330-2 . . . 330-n is shown. The edge computing unit 330-i may be used to implement or perform one or more aspects of the present disclosure. The edge computing unit 330-i may also be referred to as an "edge device" or an "edge compute unit." In some implementations, the edge computing unit 330-i may be provided as a high-performance compute and storage ("HPCS") and/or elastic-HPCS ("E-HPCS") edge device. As is further shown in FIG. 3B, the edge computing unit 330-i may be in communication with any number of assets 315 at the site 302-i, including one or more sensors 312, one or more cameras 314, and one or more vehicles 316, or others, and may transmit information or data to such assets 315, or receive information or data from such assets 315, during operations of such assets 315 at the site 302-i, over one or more local networks 320. Such local networks 320 may include, but need not be limited to, one or more networks or other systems or techniques for communicating via any wired or wireless systems or protocols, including but not limited to cellular, Wireless Fidelity (or "Wi-Fi"), radio frequency identification (or "RFID"), near-field communication (or "NFC") readers, Bluetooth®, or any other type of systems or protocols.

The site 302-i may be any one of a plurality of environments or deployment locations associated with the edge computing unit 330-i. The site 302-i may be a geographic location or area associated with an enterprise user (or another user) of edge computing, or an edge location in a data network topography in terms of data network connectivity. Alternatively, or additionally, the site 302-i may be both a geographic location of an enterprise user and an edge location in the data network topography.

The edge computing unit 330-i may be configured as a containerized edge compute unit or data center for implementing sensor data generation or ingestion and inference for one or more trained machine learning or artificial intelligence models provided thereon. For instance, the edge computing unit 330-i may include computational hardware components configured to perform inference for one or more trained machine learning or artificial intelligence models. As is shown in FIG. 3B, one portion of the edge computing unit 330-*i* may include hardware resources associated with or used to implement a first model 335-1, while another portion of the edge computing unit 330-*i* may include hardware resources associated with or used to implement an n-th model 335-*n*, where n may be any number of different machine learning or artificial intelligence models that may be operated simultaneously or in parallel. The model or models executing by the edge computing unit 330-*i* may also be referred to herein as an "edge model" or "edge models."

In some cases, the system 300 may utilize the edge computing systems 330-1, 330-2 . . . 330-*n* provided at one or more of the sites 302-1, 302-2 . . . 302-*n* to capture and process information or data received locally via the local networks 320, e.g., from any of the assets 315, and transmit the data to one or more external computing systems 350 over one or more external networks 340.

The local network 320 may provide any number of communication links between the edge computing system 330-*i* and respective ones of the assets 315. In some implementations, one or more aspects of the local network 320 may be implemented as a private or public "5G" network, "4G" network, "Long-Term Evolution" network, or other cellular network. Alternatively, or additionally, one or more aspects of the local network 320 may be implemented as a Wireless-Fidelity (or "Wi-Fi") network, a Bluetooth® network, a Zigbee network, a Z-wave network, a Long Range (or "LoRa") network, a Sigfox network, a Narrowband Internet of Things (or "NB-IoT" network), or any other short-range wireless network.

The edge computing unit 330-*i* may receive different types of information or data from any number of the assets 315, and may transmit any type of information or data received from such assets 315 to any number of external computing systems 350. For example, in some implementations, the edge computing unit 330-*i* may receive streams of information or data from any of the sensors 312, which may include but need not be limited to one or more position sensors (e.g., Global Positioning Satellite system receivers, accelerometers, compasses, gyroscopes, altimeters), imaging devices (e.g., digital cameras, depth sensors, range cameras, infrared cameras, radiographic cameras or other optical sensors), speedometers (e.g., anemometers), thermometers, barometers, hygrometers, air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), attitude indicators, depth gauges or sound sensors (e.g., microphones, piezoelectric sensors, vibration sensors or other transducers for detecting and recording acoustic energy from one or more directions). The sensors 312 may also include any number of memory or storage components and processors, photosensitive surfaces, filters, chips, electrodes, clocks, boards, timers or any other relevant features (not shown) for aiding in their operation.

In some implementations, the edge computing unit 330-*i* may also receive streams of information or data from any of the cameras 314, which may include imaging devices of any type or form, e.g., digital cameras, depth sensors or range cameras, infrared cameras, radiographic cameras or other optical sensors. The cameras 314 may be configured to photograph or otherwise capture visual information or data (e.g., still or moving images in color or black and white that may be captured at any frame rates, or depth imaging data such as ranges), or associated audio information or data, or metadata, regarding objects or activities occurring at the site 302-*i*, or for any other purpose.

For example, the cameras 314 may be configured to capture or detect reflected light if the reflected light is within fields of view of the cameras 314, which may be defined as a function of a distance between an imaging sensor and a lens within one of the cameras 314, viz, a focal length, as well as positions of the cameras 314 and angular orientations of their respective lenses. The cameras 314 may further include manual or automatic features for modifying a field of view or orientation. For example, one or more of the cameras 314 may be configured in a fixed position, or with a fixed focal length (e.g., fixed-focus lenses) or angular orientation. Alternatively, one or more of the cameras 314 may be configured with actuated or motorized features for adjusting a position, a focal length (e.g., zooming the imaging device) or an angular orientation (e.g., the roll angle, the pitch angle or the yaw angle), by causing a change in a distance between the imaging sensor and the lens (e.g., optical zoom lenses or digital zoom lenses), a change in a position of the cameras 314, or a change in one or more of the angles defining the angular orientation of the cameras 314.

In some implementations, one or more of the cameras 314 may be an imaging device that is hard-mounted to a support or mounting that maintains the cameras 314 in a fixed configuration or angle with respect to one, two or three axes. Alternatively, one or more of the cameras 314 may be provided with one or more motors and/or controllers for manually or automatically operating one or more of the components, or for reorienting the axis or direction of the cameras 314, i.e., by panning or tilting the cameras 314. Panning the cameras 314 may cause a rotation within a horizontal plane or about a vertical axis (e.g., a yaw), while tilting the cameras 314 may cause a rotation within a vertical plane or about a horizontal axis (e.g., a pitch). Additionally, one or more of the cameras 314 may be rolled, or rotated about its axis of rotation, and within a plane that is perpendicular to the axis of rotation and substantially parallel to a field of view of the cameras 314.

In some implementations, the edge computing unit 330-*i* may also receive streams of information or data from any of the vehicles 316, which may include, but need not be limited to, one or more autonomous ground vehicles, one or more autonomous aerial vehicles (e.g., drones), or any other vehicle of any type, such as cars, trucks, trailers, freight cars, container ships or aircraft, which may be manned or unmanned (e.g., drones). Such vehicles 316 may be outfitted with any number of the sensors 312 or the cameras 314 described herein.

The vehicles 316 may receive information or data of any type or form from the edge computing unit 330-*i*, and transmit information or data of any type or form to the edge computing unit 330-*i*. The vehicles 316 may also receive information or data of any type or form from the edge computing unit 330-*i*, and transmit information or data of any type or form to the assets 315, e.g., the sensors 312 or the cameras 314. For example, in some implementations, the edge computing unit 330-*i* may provide information or data regarding any number of configurations or controls to the assets 315. In some other implementations, the edge computing unit 330-*i* may receive onboard camera feed and other sensor information, e.g., 3D range scanner, LiDAR, or odometry information for Simultaneous Localization and Mapping (or "SLAM"), from the vehicles 316, and may transmit any number of instructions to the vehicles 316.

Additionally, in some implementations, the edge computing unit 330-*i* may be further utilized to execute one or more sets of instructions for locally storing information or data, executing one or more of the models 335-1 . . . 335-*n*, e.g., for inference, predictions or responses, or performing any other tasks or functions at the edge computing unit 330-*i*, with limited to no reliance on any external computing systems 350, e.g., in the "cloud." For example, the edge computing unit 330-*i* may also be used to perform inference or generate predictions locally, e.g., by executing one or more of the trained or pretrained machine learning or artificial intelligence models 335-1 . . . 335-*n* that may be received from any external computing systems 350 or any other edge computing units.

Results or predictions generated by the models 335-1 . . . 335-*n* may be compressed and periodically uploaded by the edge computing unit 330-*i* to external computing systems 350, e.g., in the "cloud," over the external network 340, which may include a satellite network configured to provide wireless satellite connectivity between the edge computing unit 330-*i* at the site 302-*i* and existing network infrastructure. Such results or predictions may be included in batch uploads transmitted over the external network 340, which may act as an Internet backhaul link, to any number of external computing systems 350. Additionally, in some implementations, results or predictions may be utilized immediately at the edge computing unit 330-*i*, and transmitted in compressed form to the external computing systems 350, e.g., in the "cloud," at a later time. For example, the external network 340 may be used to provide periodic transmission or upload of compressed prediction or inference results, e.g., during high-bandwidth or low-cost availability hours associated with the external network 340.

In some implementations, results or predictions may be obtained by performing one or more essential functions or tasks using the models 335-1 . . . 335-*n*, while offloading more computationally intensive and/or less time-sensitive tasks from the edge computing unit 330-*i* to other machine learning or artificial models executed by one or more external computing systems 350, e.g., in the "cloud." For example, in some implementations, machine learning or artificial intelligence models operated by remote computing systems, e.g., the external computing systems 350, may be utilized to train or fine-tune one or more of the models 335-1 . . . 335-*n*, and updated versions of such models may be transmitted to the edge computing unit 330-*i* over the external networks 340, e.g., via a network backhaul. In some implementations, the models 335-1 . . . 335-*n* may be trained, fine-tuned, retrained or replaced in an iterative or continuous manner. For example, in some implementations, the edge computing unit 330-*i* may be configured to perform scheduled or periodic downloads or updates of the models 335-1 . . . 335-*n* based on information or data received from the external computing systems 350. Downloads or updates of the models 335-1 . . . 335-*n* may be distributed to the edge computing unit 330-*i* in a "push" fashion, whereby the external computing systems 350 transmit updated or models to edge computing unit 330-*i* over the external networks 340, e.g., via a network backhaul, as updated or new models become available.

The edge computing unit 330-*i* may further include any number of services 332 for executing or operating with any external computing systems 350, e.g., in the "cloud," as well as an engine 334 (e.g., a high-performance compute engine) for implementing or managing the models 335-1 . . . 335-*n*, and one or more databases (e.g., data stores) 336 for maintaining information or data of any type or form thereon.

Figure 4:
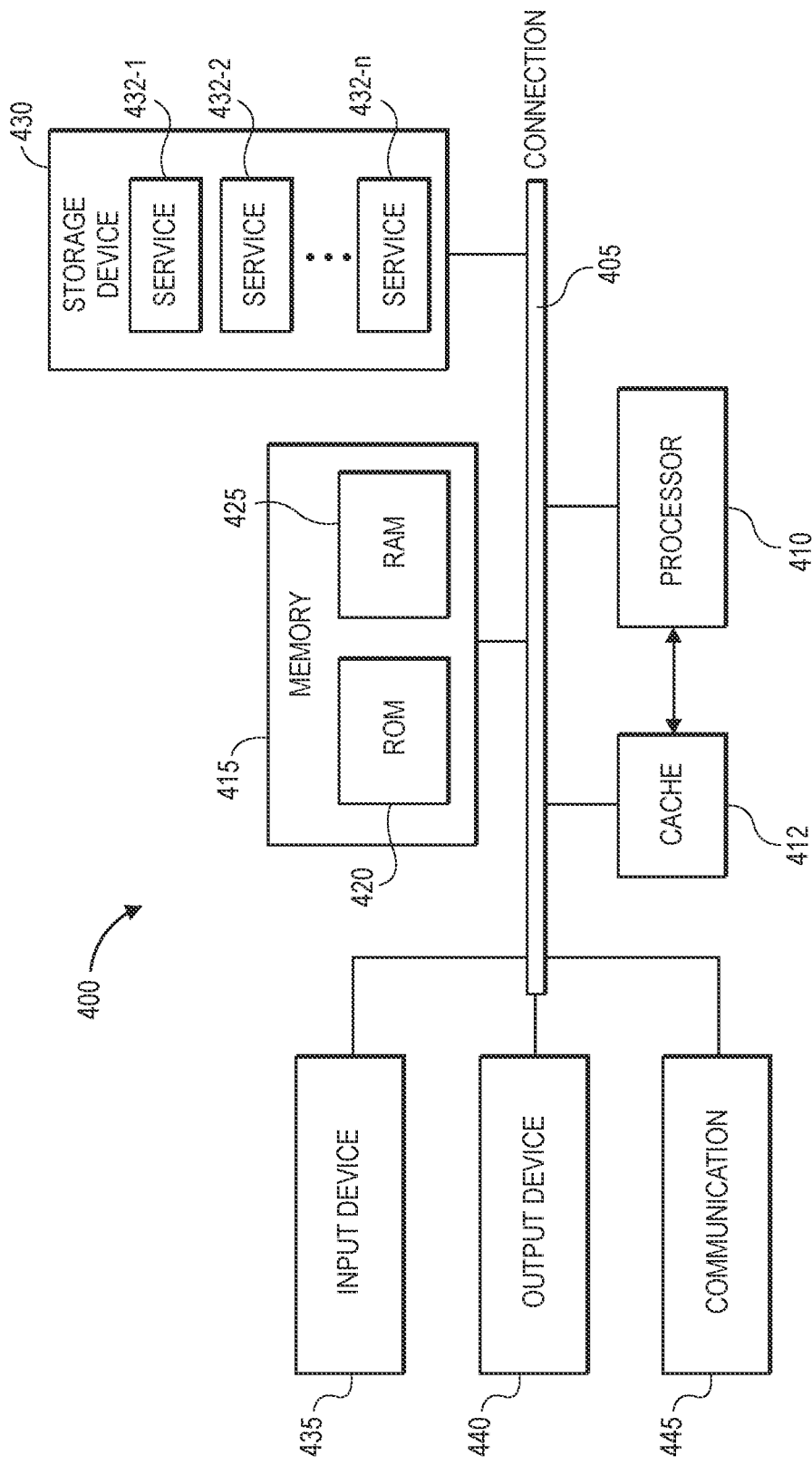
FIG. 4 is an example computing device architecture, in accordance with disclosed implementations.

Components of computing devices or systems described herein may be arranged or configured in any number of discrete architectures. Referring to FIG. 4, a computing device architecture 400 of the present disclosure is shown. In some examples, the computing device architecture 400 may be provided on an edge computing unit, such as the edge computing apparatuses 200 of FIGS. 2A and 2B, the edge computing units 330-*i*, 330-1, 330-2 . . . 330-*n* of FIGS. 3A and 3B, or any other edge computing apparatuses or units. Alternatively, or additionally, the computing device architecture 400 may be provided on any other type or form of computing devices, such as mobile devices (e.g., smartphones or the like), desktop computers, laptop computers, tablet computers, wearable devices (e.g., glasses or headsets for augmented reality or virtual reality, wrist watches, or others), servers, autonomous vehicles, robotic devices, televisions that may include one or more processors, memory components or data stores, displays, sensors, input/output (or "I/O") devices, or other systems or components that may be configured to execute one or more sets of instructions or commands described herein.

As is shown in FIG. 4, components of the computing device architecture 400 may be in electrical communication with each other by way of a connection 405, e.g., a bus. The computing device architecture 400 shown in FIG. 4 includes a processor unit 410 (e.g., a CPU, a GPU, or another processor unit) coupled to various components of the computing device architecture 400, including but not limited to a set of memory components 415, e.g., a cache of high-speed memory connected directly with, in close proximity to, or integrated as part of processor 410, such as read-only memory ("ROM") 420 and random-access memory ("RAM") 425. The processor unit 410 may be any general-purpose processor or a special-purpose processor, such as a self-contained system.

The computing device architecture 400 also includes a storage device 430 including one or more sets of data or instructions for performing various services 432-1, 432-2 . . . 432-*n*. The storage device 430 may be a non-volatile memory, a hard disk or another type of computer-readable media that may store data that is accessible to the computing device architecture 400 or other computers, such as magnetic cassettes, flash memory cards, solid state memory devices, digital versatile disks, cartridges, as well as the memory 415, e.g., the ROM 420, the RAM 425, and any others. One or more of the services 432-1, 432-2 . . . 432-*n* may be provided and executed for controlling the processor unit 410 or any other aspect of the computing device architecture 400.

The computing device architecture 400 further includes an input device 435, an output device 440 and a communications interface 445. The input device 435 enables interaction with the computing device architecture 400 and may represent any number of input mechanisms, e.g., a microphone for receiving sounds or speech signals, a touch-sensitive screen for receiving gestures or other manual inputs, or others. The output device 435 may represent any number of output mechanisms, e.g., a display, a projector, a television, a speaker device, or others. The communications interface 445 may be configured to govern or manage inputs received from users via the input device 435 and outputs to be provided to such users via the output device 440.

As used herein, the terms "device," "system" or "unit" need not be limited to any one or a specific number of physical objects (such as one smartphone, one controller, one processing system and so on), and may instead refer to any system having any number of parts that may implement any portions of the present disclosure. Likewise, the terms "device," "system" or "unit" are not limited to any configuration, type, or number of objects.

Devices implementing processes and methods according to these disclosures may include hardware, software, firmware, middleware, microcode, hardware description languages, or any combinations thereof, and may take any of a variety of form factors. When implemented in software, firmware, middleware, or microcode, the program code or code segments to perform the necessary tasks (e.g., a computer-program product) may be stored in a computer-readable or machine-readable medium.

Figure 5:
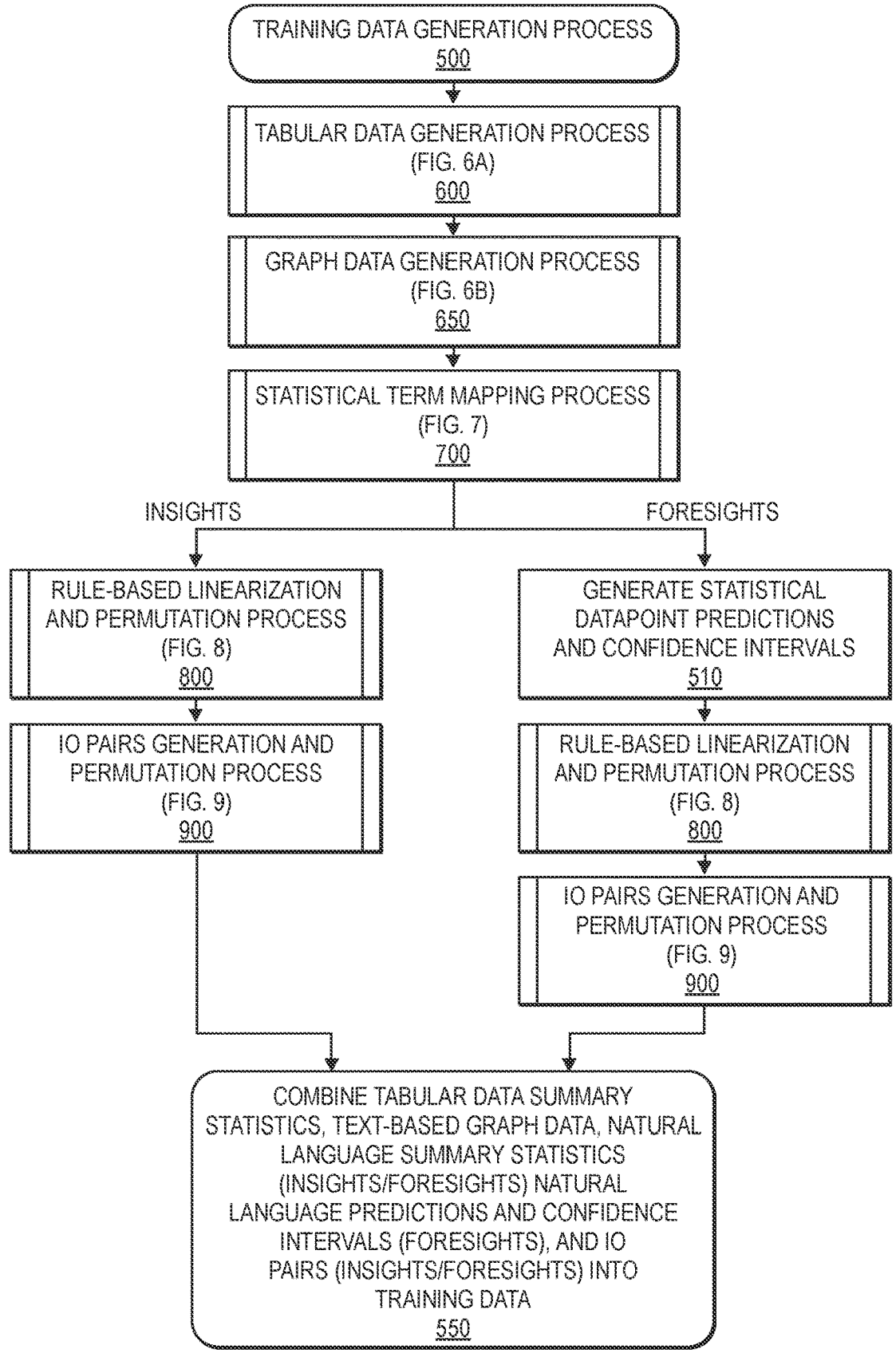
FIG. 5 is an example training data generation process, in accordance with disclosed implementations.

FIG. 5 is an example training data generation process 500, in accordance with disclosed implementations. As noted above, generation of training data, such as through the example processes 500 (FIG. 5), 600 (FIG. 6A), 650 (FIG. 6B), 700 (FIG. 7), 800 (FIG. 8) and 900 (FIG. 9) may be performed on traditional computing resources, such as the computing resources 121 discussed above with respect to FIGS. 1A and 1B, using, for example, one or more LLMs.

The example process 500 begins by generating tabular data, such as through the example tabular data generation process 600, discussed further below with respect to FIG. 6A. As discussed below, the tabular data may include time-based or streaming data obtained from any of a variety of different sources. In addition, the example graph data generation process 650 may also be performed to generate text-based graph data, discussed further below with respect to FIG. 6B. As discussed below, the text-based graph data may include time-based data or other statistical data that may be used to generate one or more graphical representations based on the text-based graph data.

After generation of tabular data, the example process 500 performs a statistical term mapping that maps computations of the tabular data to one or more statistical terms, such as the example list of statistical terms discussed above. Statistical term mapping may be performed through use of the example statistical term mapping process 700 discussed below with respect to FIG. 7. As discussed below, the example statistical term mapping process 700 may generate a plurality of summary statistics for the tabular data.

Upon receipt of the summary statistics of the tabular data from the example process 700 the example process 500 may perform, in series or parallel, a linearization of the summary statistics that may be used for insights and foresights, as illustrated by the two parallel paths represented in FIG. 5. As discussed herein, insights relate to events or data that has occurred, referred to herein as historical data or historical events. Insights may include either or both diagnostic insights, which illustrate what might have happened based on the historical data or historical events, and descriptive insights, which illustrate what has already happened based on the historical data or historical events. In comparison, foresights, relate to forecasted or predicted data and/or events, referred to herein generally as forecasted data or forecasted events. Foresights may include either or both predictive foresights which illustrate what could happen based on the forecasted or predicted data and/or events, and prescriptive insights which illustrate what should happen based on the forecasted or predicted data and/or events.

As part of the foresight generation, statistical datapoint predictions, confidence intervals, and/or text-based graph descriptions may also be generated for inclusion as part of the training data, as in 510. For example, and as discussed herein, a hybrid modeling that synergistically combines the strengths of tree-based models and neural networks may be utilized. Tree-based models may serve as a foundational layer, offering both interpretability of the tabular data and the ability to determine non-linear relationships between the different data sources of the tabular data. In parallel, the neural networks enhance the model's predictive power by handling temporal dependencies inherent in sequential (e.g., time-series) data. To improve the reliability of predictions, bootstrapping methods may also be utilized to generate multiple resampled datasets from the original tabular data, facilitating the calculation of a distribution of possible future states. This distribution may be sequentially analyzed to derive confidence intervals, providing a quantifiable measure of the reliability of the predictions. The integration of these diverse modeling techniques and statistical methods enables the generation, in accordance with the disclosed implementations, of foresights with statistical confidence.

For both insights and foresights, the summary statistics may be processed to convert the summary statistics into natural language summary statistics that can be used as part of a natural language conversation, whether textual based or audio based. In addition, for foresights, the statistical datapoint predictions may be linearized to generate natural language predictions and confidence intervals.

Foresights and insights may be processed separately because insights are generating natural language summary statistics for events that have already occurred, based on the starting reference point within the tabular data and looking back-in-time. For example, insights may be generated based on a starting point at the end of the time-based data included in the tabular data, and looking back into the tabular data and corresponding summary statistics to generate natural language summary statistics for events that have already occurred. In comparison, foresights may be generated based on a starting point at the beginning of the time-based data included in the tabular data, and looking forward into the tabular data and corresponding summary statistics to generate natural language summary statistics for events predicted to occur after the starting point.

As a non-limiting example, if weather data relating to temperature is processed over a period of five days to generate an average temperature of 75 degrees Fahrenheit, the summary statistic may be represented for that section of the tabular data as "average temperature=75° F." As discussed further below with respect to FIG. 8, such a summary statistic may be converted into a natural language summary statistic that maybe represented as "The average temperature over the last five days was 75° F.," or some other similar natural language permutation, as in 800. Likewise, as discussed below with respect to FIG. 8, any number of permutations of the generated natural language summary statistics may be generated for inclusion in the training data.

After generating natural language summary statistics and natural language predictions and confidence intervals for foresights, as well as text-based graph descriptions for insights and/or foresights, IO pair generation and permutation may be performed utilizing the natural language summary statistics and/or text-based graph descriptions for insights and IO pair generation and permutation may be performed utilizing the natural language summary statistics and natural language predictions, confidence intervals, and text-based graph descriptions for foresights. Like linearization and permutation of the summary statistics, IO pairs generation and permutation for both insights and foresights may be performed in parallel. IO pairs generation and permutation is discussed further below with respect to FIG. 9 and the example IO pairs generation and permutation process 900.

Upon receipt of the IO pairs from the example process 900, the tabular data, summary statistics, natural language summary statistics for both insights and foresights, natural language predictions and confidence intervals for foresights, text-based graph descriptions for both insights and foresights, and IO pairs for both foresights and insights may be combined as the training data produced by the example process 500 and available for use to train or fine tune an edge model, as in 550.

Figure 6A:
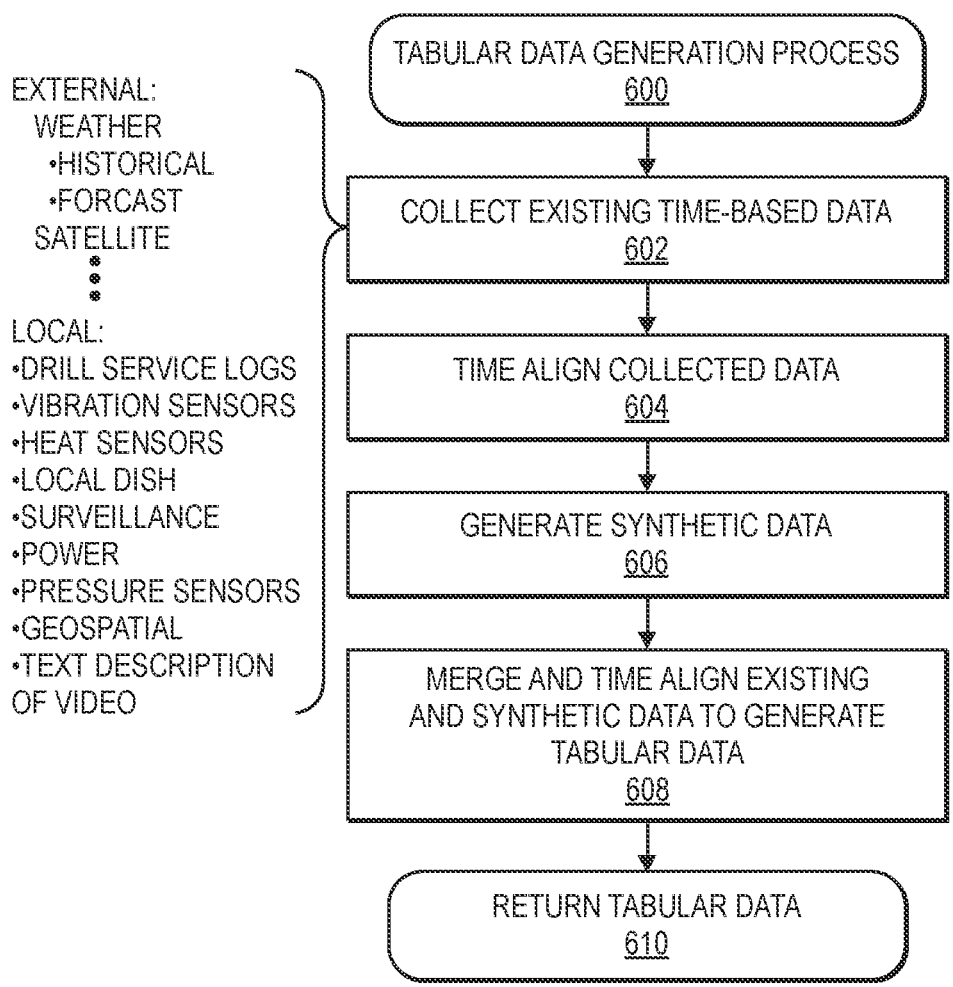
FIG. 6A is an example tabular data generation process, in accordance with disclosed implementations.

FIG. 6A is an example tabular data generation process 600, in accordance with disclosed implementations.

The example process begins by collecting existing time-based data, as in 602. As discussed above, any of a variety of time based data, with the same or different sampling frequencies, may be collected and utilized as part of the example process. For example, time based data may be collected from one or more cameras, weather stations, vibration sensors, motions sensors, pressure sensors, telemetry data, satellite data, power station data, local dish data, heat sensors, geospatial data, transmission data, or any other device, sensor, or service that generates or provides time-based data. Alternatively, or in addition thereto, other forms of time-based data may also be collected. Other forms include, but are not limited to, service logs, surveillance logs, power logs, etc. In some implementations, the time-series data may be obtained from the edge location. In other examples, some or all of the time-series data may be obtained from another edge location, such as a similar edge location (e.g., similar weather patterns, similar operating components, similar edge location, the same operator/business/user, etc. For example, if the edge location is being deployed to an oil platform in the Gulf of Mexico, time-series data collected and/or used at that oil platform and/or from other oil platforms, or ships, weather stations, etc., located in the Gulf of Mexico may be utilized with the disclosed implementations.

The collected time-based data may then be time-aligned and organized into tabular data, as in 604. For example, each row of the tabular data may represent a different data source and different columns may contain samples of the time-based data, with each column being aligned in time. For example, sample data may be normalized or based upon a master clock.

In addition, in some implementations, synthetic data may be generated to supplement the collected time-based data, as in 606. As will be appreciated, different sources of time based data may be generated at different frequencies. In some implementations, some or all of the tabular data may be supplemented with interpretations between time samples to complete the tabular data. For example, if weather data is sampled on five-minute intervals and included in tabular data with satellite latency samples that are sampled at one-minute intervals, the weather data may be supplemented to include synthetically determined samples at each minute between the five minute intervals. For example, a larger portion of the weather samples (e.g., three hours) may be processed to determine a trend line of the weather data and synthetic samples generated based on that trend line to correspond with the sample frequency of the satellite latency samples. As will be appreciated, the sample frequency between different and independent data sources may vary greatly, with some data sources sampling every millisecond and others only sampling hourly, or daily. Accordingly, in some implementations, while time-alignment of the data samples may be performed, synthetic supplementation between samples may or may not be done for each instance of sampled data.

In addition to generating tabular data from historical data obtained from different data sources, in some implementations, synthetic datasets may be generated and included in the initial training data. For example, based on the knowledge of statistical terms (discussed herein) that will be used to generate the training data that is utilized to train and fine-tune an edge model(s), synthetic instances of tabular data may be dynamically generated with statistics randomly selected to ensure a diverse representation and to ensure that the dataset is relevant to the edge model(s) that is to be trained. Likewise, to represent the variability between different data sources (e.g., sampling frequency) in real-word data, the synthetic data may differ in dimensions, encompassing a range of row and column counts. Likewise, to better simulate real-world examples, elements of randomness and/or noise may be introduced into the synthetic data thereby generating a larger and more realistic distribution of data and instances of outliers.

Finally, if the synthetic data is generated separately from the collected data, the synthetic data and the collected data may be merged and time-aligned by column to generate tabular data, as in 608.

The example process 600 completes by returning the generated tabular data, as in 610.

Figure 6B:
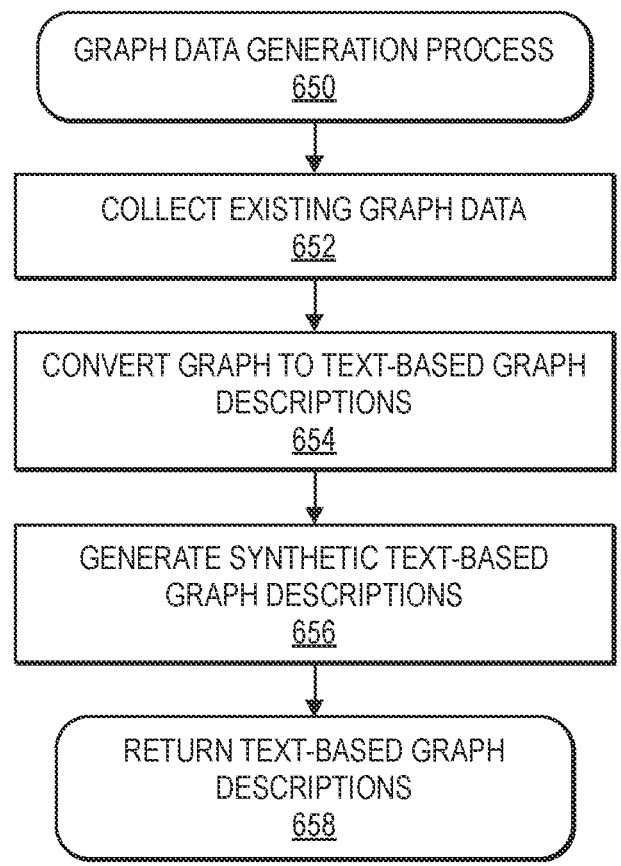
FIG. 6B is an example graph data generation process, in accordance with disclosed implementations.

FIG. 6B is an example graph data generation process 650, in accordance with disclosed implementations.

The example process 650 begins by collecting existing graph data, whether in graphical form or textual description of graphical data, as in 652. As discussed, any of a variety of graph data, whether in graphical form or a textual description of the graph data, also referred to herein as text-based graph descriptions, may be collected and utilized as part of the example process. For example, graph data may be collected from one or more pre-existing graphical reports from the edge location and/or from other edge locations, etc. For example, if the edge location is being deployed to an oil platform in the Gulf of Mexico, time-series data collected and/or used at that oil platform and/or from other oil platforms, or ships, weather stations, etc., located in the Gulf of Mexico may be utilized with the disclosed implementations. In some implementations, the graph data may be directed toward outliers, or anomalies in the statistical data. Still further, in some examples, some or all of the tabular data generated by the example tabular data generation process 600 may be utilized to generate text-based graph descriptions.

Returning to FIG. 6B, for existing graph data that is in graph form, the graph data may be converted into text-based graph descriptions, as in 654. For example, the graph may be rasterized or vectorized, etc., and the resulting raster file or vector file may be processed using existing techniques to generate the text-based graph description. In other examples, the graph may be directly converted to a text-based graph description.

Still further, in addition to historical data obtained from the edge location and/or other edge locations for the text-based graph data, in some implementations, synthetic text-based graph descriptions may be generated, as in 656. For example, based on the knowledge of statistical terms (discussed herein) that will be used to generate the training data that is utilized to train and fine-tune an edge model(s), synthetic instances of text-based graph descriptions may be dynamically generated with statistics randomly selected to ensure a diverse representation and to ensure that the generated graphs are relevant to the edge model(s) that is to be trained. Likewise, to represent the variability between different data sources (e.g., sampling frequency) in real-word data, the synthetic graph data may differ in dimensions. Likewise, to better simulate real-world examples, elements of randomness and/or noise may be introduced into the synthetic graph data thereby generating a larger and more realistic distribution of data and instances of outliers.

Finally, the text-based graph descriptions may be returned and the example process 650 completed, as in 658.

Figure 7:
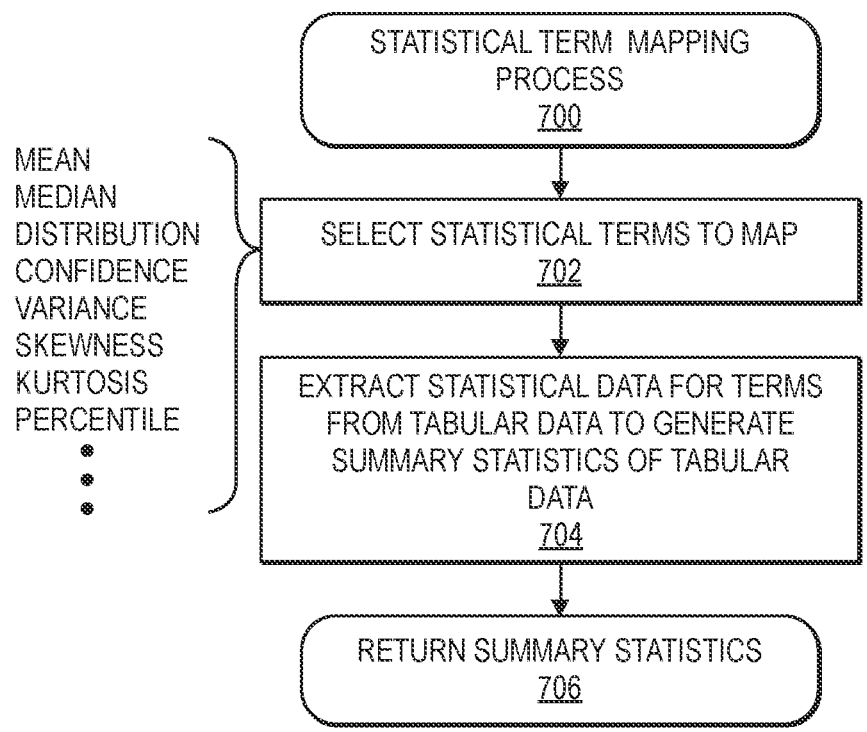
FIG. 7 is an example statistical term mapping process, in accordance with disclosed implementations.

FIG. 7 is an example statistical term mapping process 700, in accordance with disclosed implementations.

The example process 700 begins by selecting statistical terms to map from the tabular data, as in 702. An example list of statistical terms is presented above. In some implementations, all statistical terms may be mapped. In other implementations, statistical terms that are relevant to the edge location and/or the data that may be received and/or generated at the edge location and processed by an edge model that is to be trained in accordance with the disclosed implementations may be selected.

The tabular data may then be processed to generate summary statistics for each of the statistical terms, as in 704. For example, for each statistical term, which may correspond to a mathematical formula or projection, the mapping may include an indication of the tabular data that is to be processed to generate the summary statistics for each of the statistical terms. For example, for the statistical term "mean," the tabular data may be processed for each data source, each type of data (e.g., temperature during a 24-hour period), etc., to compute the mean for that aspect of the tabular data.

The example process completes and returns the generated summary statistics for the tabular data, as in 706.

Figure 8:
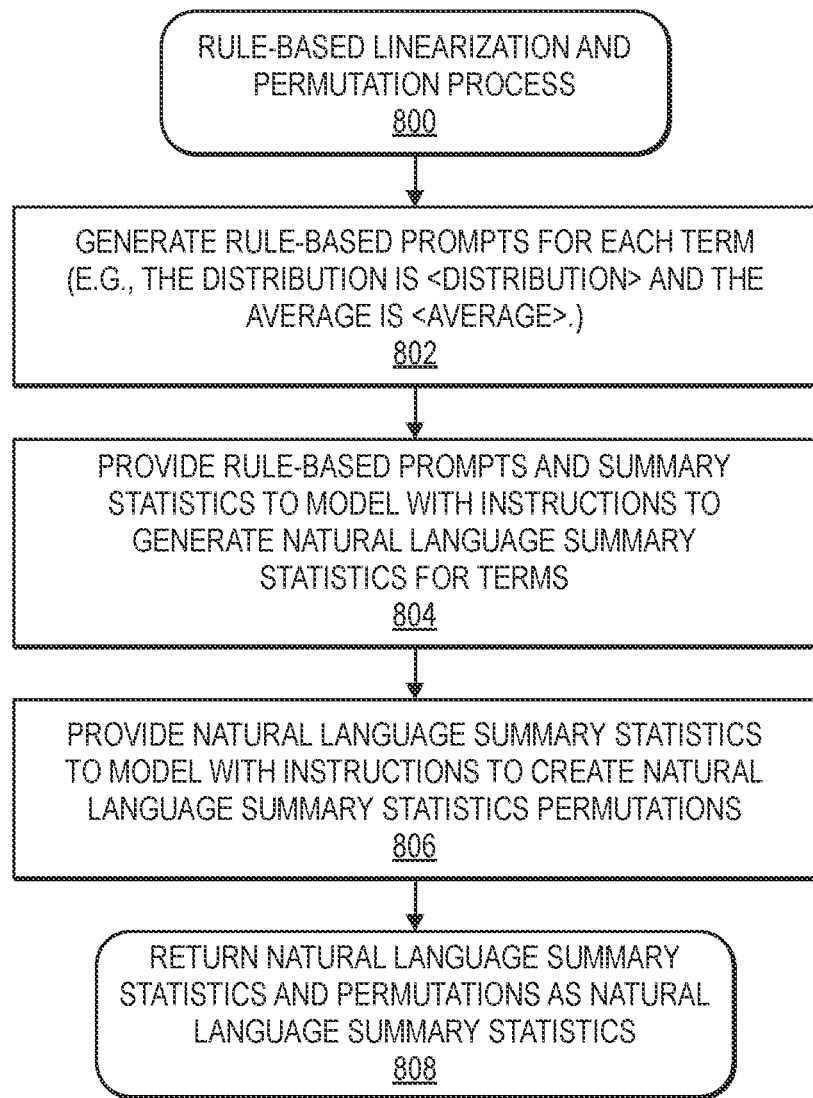
FIG. 8 is an example rule-based linearization and permutation process, in accordance with disclosed implementations.

FIG. 8 is an example rule-based linearization and permutation process 800, in accordance with disclosed implementations. As discussed above, the example process 800 may be performed separately for each of insights and foresights, although the same tabular data and summary statistics may be utilized.

The example process 800 begins by generating rule-based prompts for each term of the statistical terms that were selected and used to generate summary statistics, as in 802. If the example process is being used to generate natural language for insights, the rule based prompts will be structured as insights as they will be generated based on historical data that has already been collected. In comparison, if the example process 800 is being used to generate natural language for foresights, the rule based prompts will be structured as foresights as they will be generated looking forward and based upon predicted data and events that are predicted to occur. In addition, in some implementations, the natural language foresights may also include datapoint predictions and confidence intervals, as discussed above.

As an example, a rule-based prompt for an insight may be "The distribution is <distribution> and the average is <average>" and the instruction may be for the model that is processing the summary statistics to generate a natural language based on the rule based prompt and include the distribution and average in the natural language. Any number of rule-based prompts may be generated and utilized with the disclosed implementations.

The example process 800 may provide the rule-based prompts and instructions to generate natural language summaries based on the summary statistics and the rule-based prompts, as in 804. For example, the rule-based prompts, summary statistics and the instructions may be provided to an ML or AI model, such as an LLM, and the model may generate natural language summary statistics for each of the rule based prompts, utilizing the summary statistics.

The generated natural language summary statistics may then be provided to the same or a different ML or AI model, with instructions that the model generate further permutations of the natural language summary statistics, as in 806. Any number of permutations may be generated for each of the natural language summary statistics. Generation of permutations of the natural language summary statistics for the different summary statistics provides a diverse array of new linearization prompts, thereby enriching the training data with a wide range of linearization representations.

For foresights, the example process may also incorporate datapoint predictions and/or confidence intervals into the rule-based prompts. In such an example, the model May process the rule-based prompts, summary statistics, and data point predictions and/or confidence intervals to generate the natural language summary statistics.

The example process completes by returning the natural language summary statistics and the permutations thereof as natural language summary statistics for the dataset, as in 808.

Figure 9:
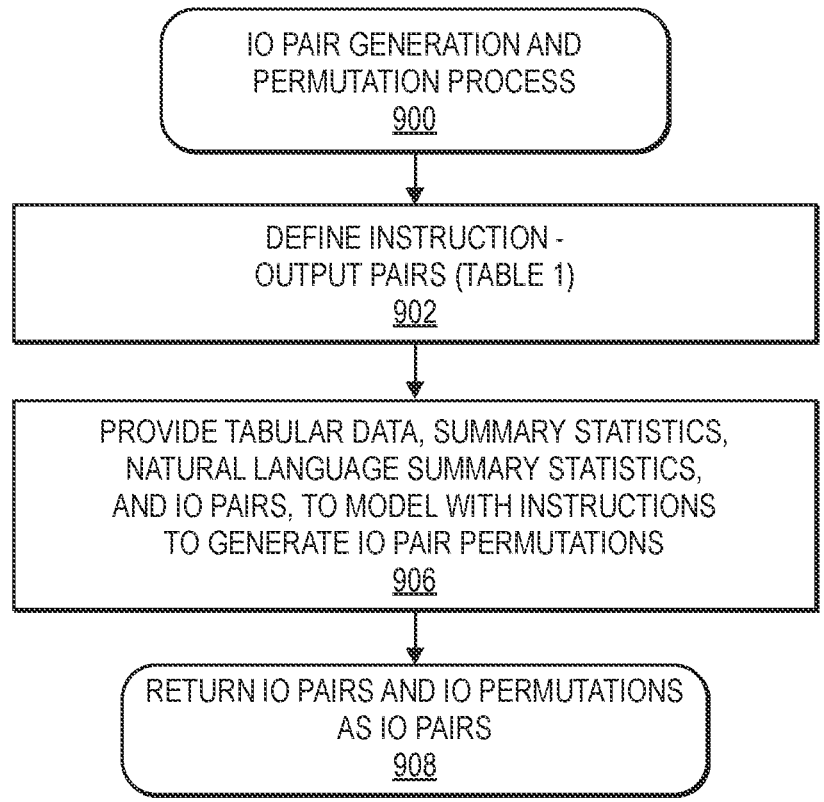
FIG. 9 is an example instruction and output pair generation and permutation process, in accordance with disclosed implementations.

FIG. 9 is an example IO pair generation and permutation process 900, in accordance with disclosed implementations.

The example process 900 begins by defining IO pairs, as in 902. Any number of IO pairs may be generated. The IO pairs may encompass a wide range of scenarios, from tabular data instructions leading to data summaries, such as JSON data summaries, to questions paired with summary statistics yielding specific answers. The following Table 1 is an example of instruction input pairs that may be utilized to ensure exposure of the model to be trained with a myriad of data scenarios, enhancing its versatility and comprehension.

TABLE 1

| Instruction | Output |
| --- | --- |
| Tabular Data + instruction | JSON data summary |
| JSON data summary + instruction | Data summary description |
| Tabular Data + data point + instruction | Data v. statistics comparison |
| Data summary + data point + instruction | Data v. statistics comparison |
| Question + Tabular data | Answer |
| Question + Data summary | Answer |
| Question + data summary + data point | Answer |
| Question + Tabular data + data point | Answer |
| Questions + Plots JSON | Answer |
| Tabular data + Plot's JSON | Data v. statistics comparison + plot definition |
| Data Summary + data point + Plot's JSON | Data v. statistics comparison, + plot definition |

The example process may then provide the tabular data, summary statistics, natural language summary statistics, and IO pairs to a model, such as an LLM, with instructions to generate IO pair permutations for each provided IO pair, as in 906. Any number of IO pair permutations may be generated.

Finally, the example process 900 completes by returning the IO pairs and IO pair permutations as IO pairs to be included in the training data, as in 908.

As discussed above, the example processes 500-900 may be used to generate training data that may then be used to train or fine tune an edge model that may be deployed to a site/edge location.

Figure 10:
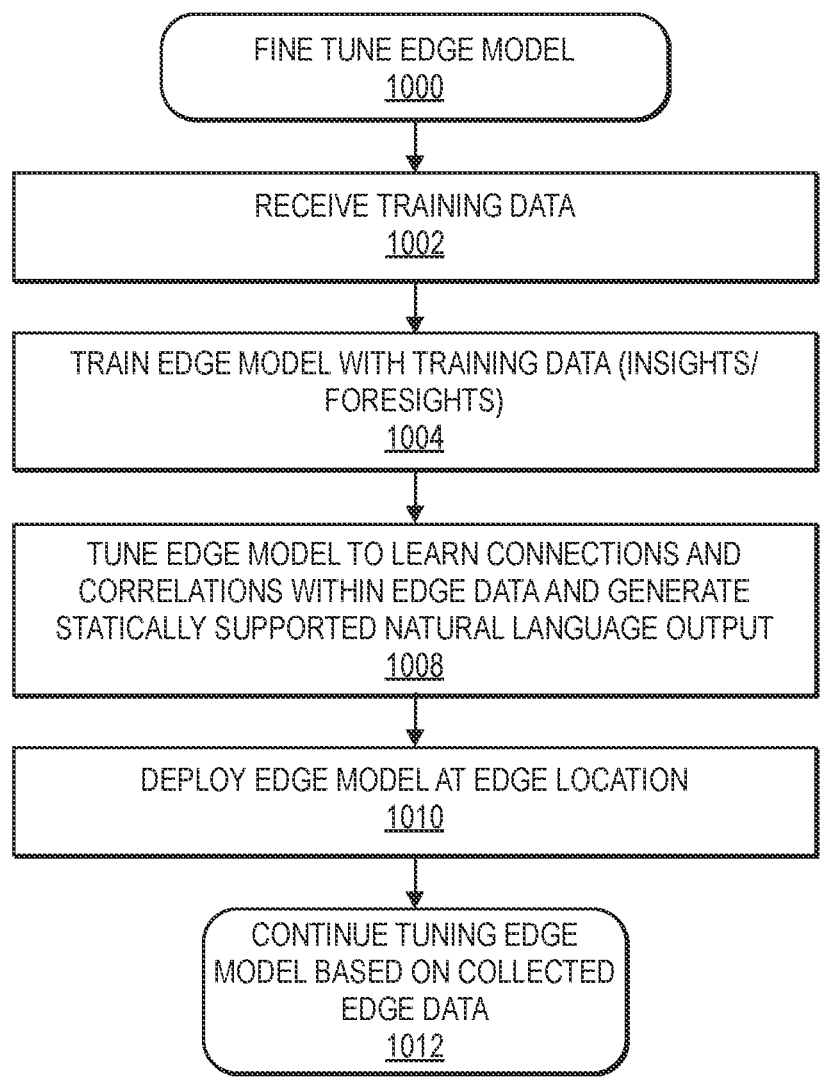
FIG. 10 is an example fine tune edge model process, in accordance with disclosed implementations.

FIG. 10 is an example fine tune edge model process 1000, in accordance with disclosed implementations. In some implementations, the example process may be executing at an edge location to train an edge model at that location. In other implementations, the example process 1000 may be executing on a computing resource to train an edge model that is subsequently transferred to an edge location.

The example process 1000 begins by receiving the training data generated by the example processes 500-900, as in 1002. Upon receipt of the training data, the example process may utilize the training data to train or fine tune the edge model for both insights and foresights, as in 1004. As part of the tuning, the edge model will utilize the training data and learn correlations and relationships between the tabular data and summary statistics of the training data. The edge model will also learn how to understand the statistical data and how to generate natural language outputs that are supported by the statistical data, as in 1008. Still further, fine-tuning may include tuning based on baseline or known edge data at the edge location, data obtained from other edge locations (e.g., similar edge locations, etc.), etc., so that the edge model learns the relationships and correlations that are specific to the edge location.

Once tuning of the edge model is complete or at a desired level of accuracy, the model may be deployed and begin providing natural language outputs at the edge location and providing interactions and responses to inputs and data, as in 1010.

Upon deployment, the edge model may continuously or periodically tuned based on data received or generated at the edge location and/or based on events detected at the edge location, as in 1012.

With a trained edge model executing at an edge location, in accordance with the disclosed implementations, vast amounts of data can be efficiently processed locally at the edge location without the need for massive compute capacity at the location and without the need for interconnectivity between the edge location and other computing resources. Still further, as discussed below, in some implementations, the edge model can be further streamlined by selecting which data sources the edge model is to consider when providing information for different workspaces created at the edge location. As discussed below, multiple different workspaces may be generated at an edge location and those workspaces may be serviced and maintained by the edge model. Different workspaces may utilize the same or different data sources when generating insights and foresights for that workspace.

Figure 11:
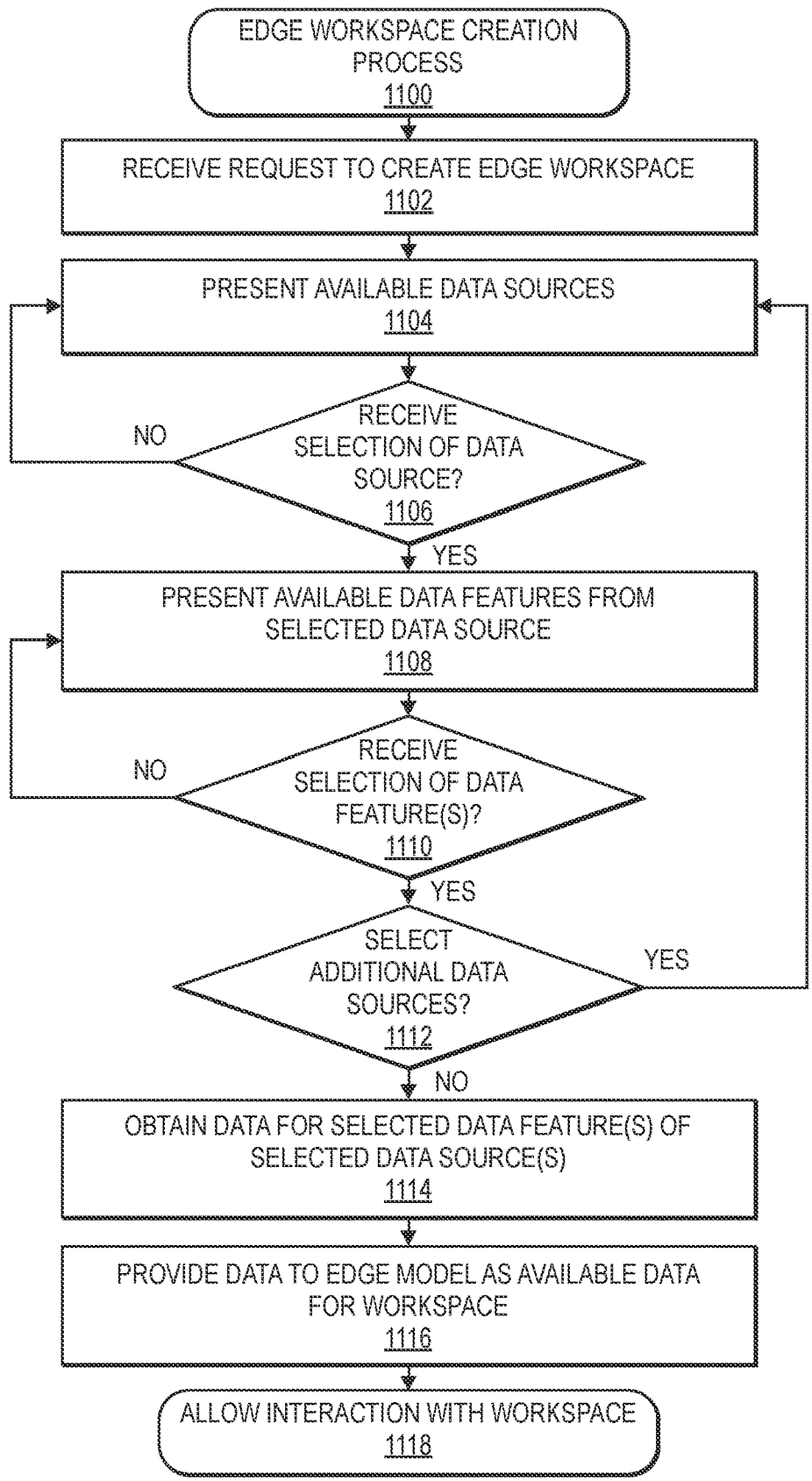
FIG. 11 is an example edge workspace creation process, in accordance with disclosed implementations.

FIG. 11 is an example edge workspace creation process 1100, in accordance with disclosed implementations.

The example process begins with the receipt of a request to create an edge workspace, as in 1102. For example, and referring to FIG. 12, which is an illustration of an example edge management service dashboard 1200 interface, in accordance with disclosed implementations, an operator may access the edge management service dashboard and perform a variety of actions. For example, the edge management service dashboard 1200 may present notification of reports 1210, notification of alerts 1212, etc., all of which may be determined and generated by the edge model and that are relevant to the edge location. In addition, as discussed herein, the operator may select one or more of the workspaces controls 1202, the alerts control 1206, or the reports control 1208, that are presented on the interface 1200. Selection of the workspaces control 1202 allows an operator to create a workspace that utilizes selected data sources to provide information relevant to the edge location and specific for that workspace. Selection of the alerts control 1206 allows an operator to generate alerts, foresights and/or insights, that are specific to the edge location, specific to particular data sources, and/or specific to particular workspaces. Selection of the reports control 1208 enables the operator to create reports, foresight and/or insights, that are specific to the edge location, specific to particular data sources, and/or specific to particular workspaces.

Figure 12:
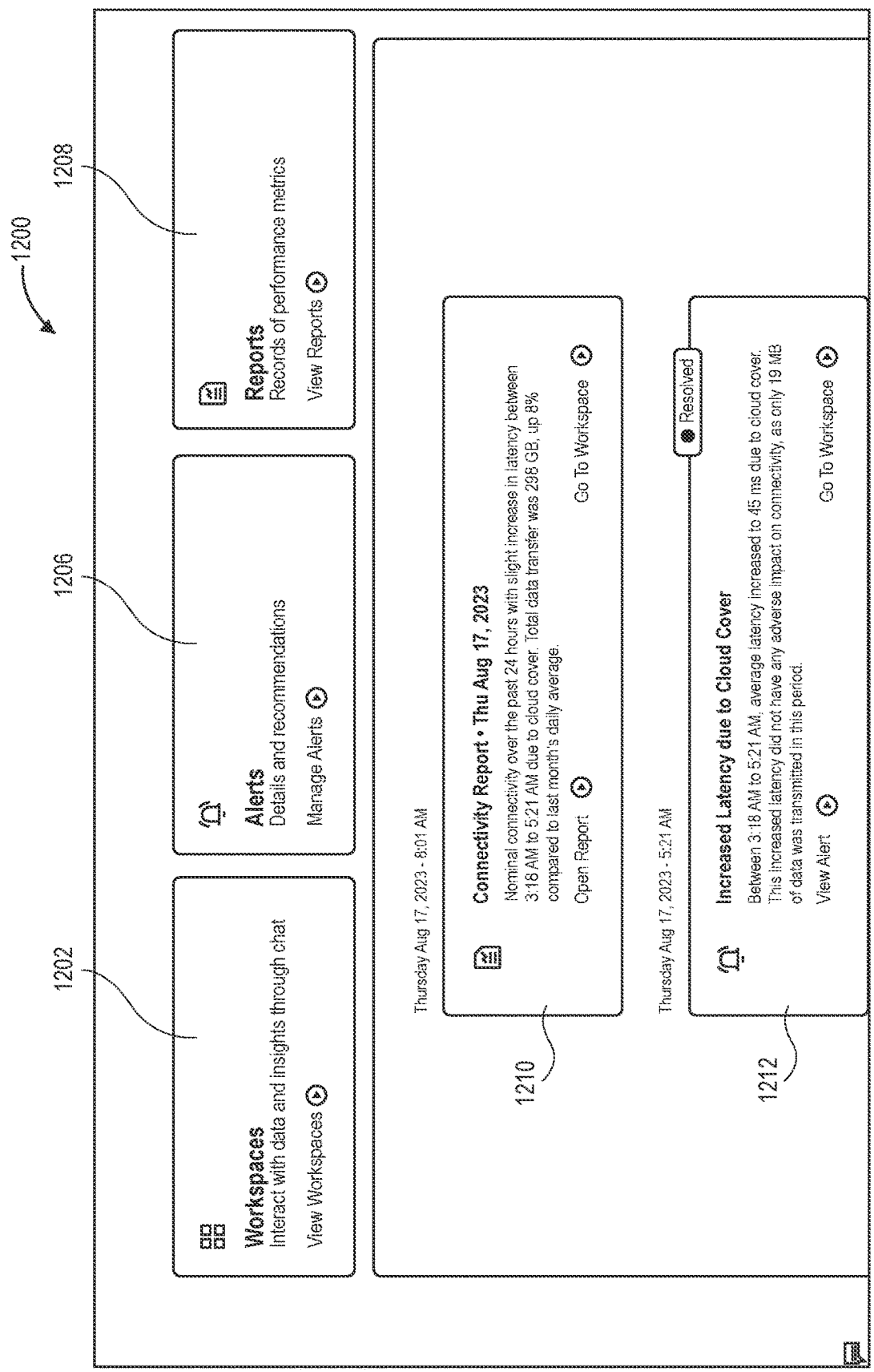
FIG. 12 is an illustration of an example edge management service dashboard interface, in accordance with disclosed implementations.

In the example discussed with respect to FIG. 12, the operator selects the workspace control 1202.

Figure 13A:
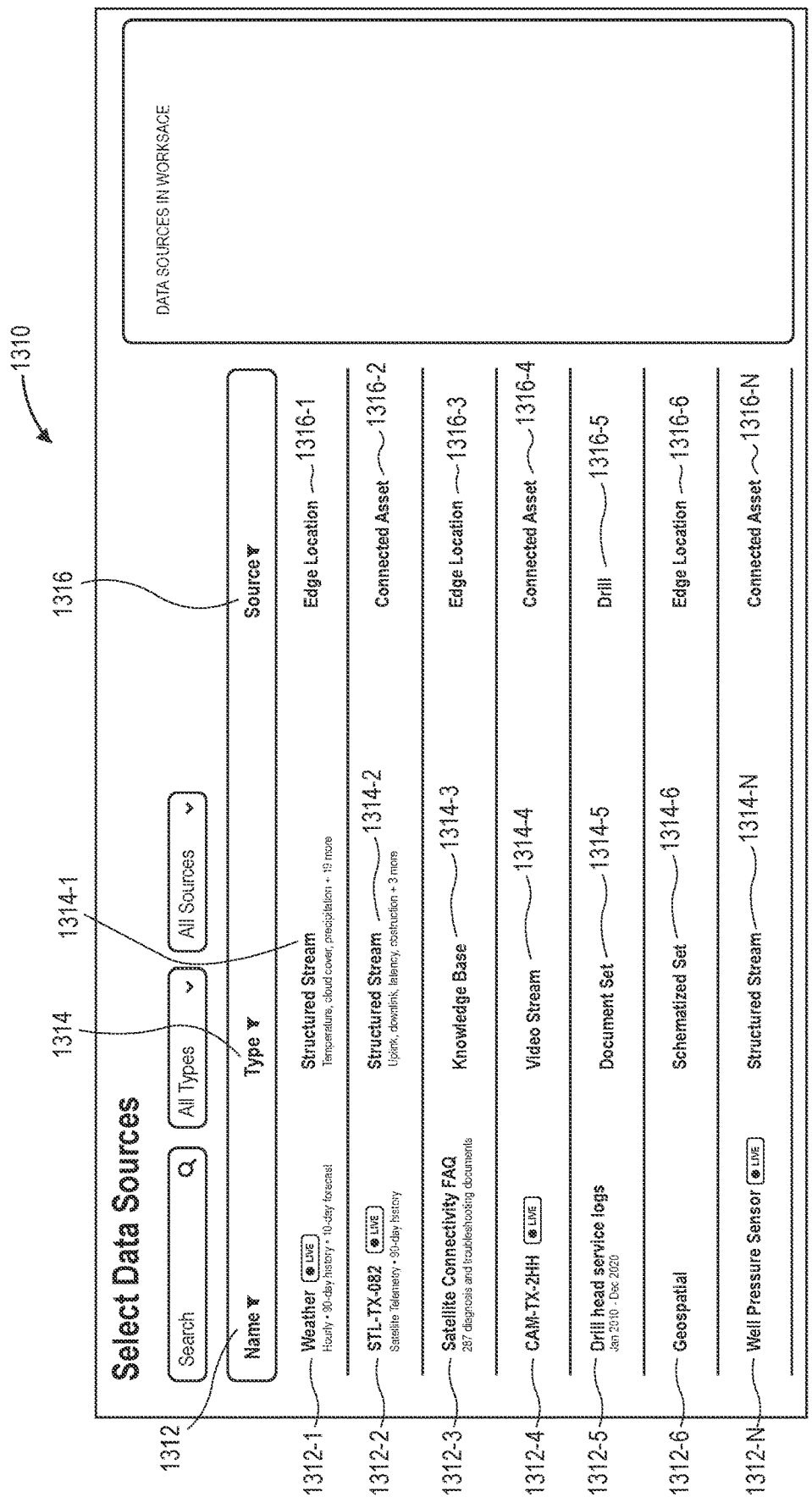
FIG. 13A is an illustration of an example workspace data source selection interface, in accordance with disclosed implementations.

Returning to FIG. 11, upon receiving a request to create an edge workspace, such as the request received in response to an operator selecting the workspaces control 1202 (FIG. 12), the example process 1100 presents available data sources that may be selected from and utilized by the edge model in providing the workspace, as in 1104. For example, FIG. 13A is an illustration of an example workspace data source selection interface 1310, in accordance with disclosed implementations. The example workspace data source selection interface 1310, which may be presented in response to an operator selecting the workspaces control 1202 (FIG. 12), may provide a selectable list of data sources that are generated or accessible by the edge model at an edge location. Any of a variety of information may be provided about each data source, including, but not limited to, the name 1312 of the data source, the type 1314 of data source, and the source 1316 from which the data of the data source is obtained. In the example illustrated with respect to FIG. 13A, the data sources accessible at the edge location include a weather data source 1312-1, a satellite telemetry data source ("STL-TX-082") 1312-2, a satellite connectivity FAQ 1312-3, a camera data source ("CAM-TX-2HH") 1312-4, a drill head service logs data source 1312-5, a geospatial data source 1312-6, through a well pressure sensor 1312-N. As will be appreciated, any number and/or type of time-based or streaming data source that is accessible by and/or created at the edge location may be included in the list of available data sources. Available data sources may include historic and/or forecasted data.

In addition to the name of the data source, the type 1314 and/or source of the data source may be included in the data source selection interface 1310. In this example, the weather data source 1312-1 is indicated to be a structured stream 1314-1 that includes temperature, cloud cover, precipitation and 19 other data features, and is provided from data generated at the edge location 1316-1. The satellite data source 1312-2 is also indicated to be a structured data stream 1314-2 that includes uplink, downlink, latency, obstruction, and three other data features, and is received from a connected asset 1316-2, such as a satellite, that is connected to and communicating with the edge location (such communication may be on-demand, periodic, continuous, etc.). The Satellite FAQ 1312-3 is indicated to be a knowledge base 1314-3 that is generated or accessible from the edge location

1316-3. The Camera data source 1312-4 is indicated to be a video stream 1314-4 data source that is received from a connected asset 1316-4, such as a camera. The drill head service logs 1312-5 data source is indicated to be a document set 1314-5 data source that is obtained from a drill head 1316-5. The geospatial 1312-6 data source is indicated to be a schematized set 1314-6 data source that is generated or accessible from the edge location 1316-6. The well pressure sensor 1312-N is indicated to be a structured steam 1314-N data source that is received from a connected asset 1316-N. As will be appreciated additional, fewer, and/or different data sources and/or information about the data sources may be presented. Likewise, the operator may select one, many, or all of the data sources as part of a workspace generation.

Returning to FIG. 11, after presenting the available data sources, a determination may be made as to whether a selection of a data source has been received, as in 1106. If it is determined that a selection of a data source has not been received, the example process 1100 returns to block 1104 and continues. If it is determined that a data source has been selected, available data features of that data source may be presented for selection, as in 1108.

Figure 13B:
FIGS. 13B and 13C are illustrations of example data source feature selection interfaces, in accordance with disclosed implementations.
Figure 13C:
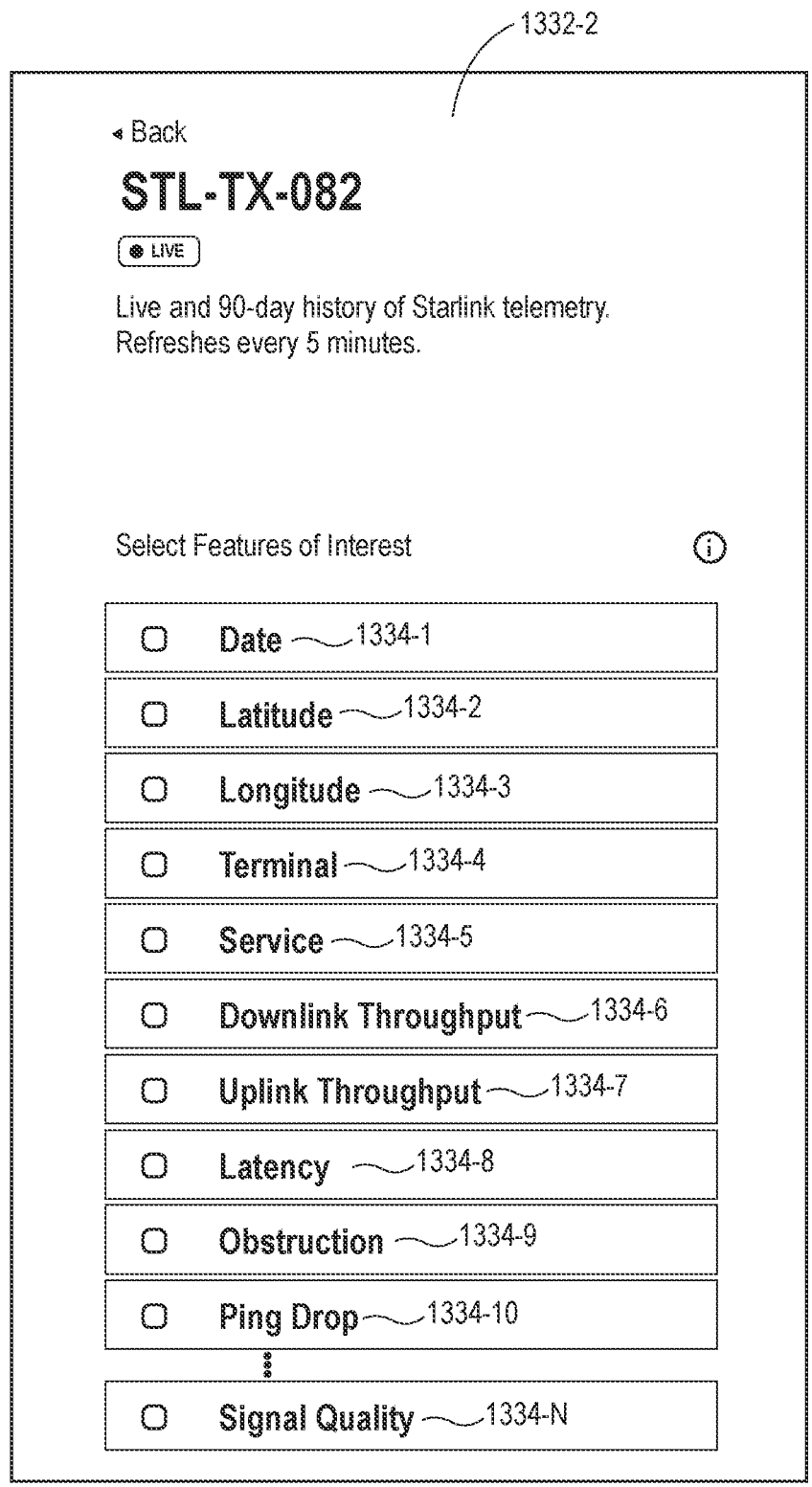

For example, FIGS. 13B and 13C are illustrations of example data source feature selection interfaces 1322-1/1322-2, in accordance with disclosed implementations.

Referring first to FIG. 13B, the Weather data source feature selection interface 1322-1 may be presented in response to an operator selecting the weather data source 1312-1. An operator may interact with the weather data source selection interface 1322-1 and select one or more data features of the data source that are to be considered by the edge model with respect to the workspace that is being created as part of the example process 1100. In the illustrated example, the weather data source includes the data features of date 1324-1, latitude 1324-2, longitude 1324-3, temperature 1324-4, wind speed 1324-5, wind direction 1324-6, precipitation 1324-7, humidity 1324-8, pressure 1324-9, visibility 1324-10, through cloud cover 1324-N. As will be appreciated, additional, fewer, and/or different data sources may be presented.

As another example, FIG. 13C illustrates a data source selection interface 1332-2 that may be presented in response to selection of the satellite data source 1312-2 interface. In the illustrated example, the data features for the satellite data source 1312-2 include date 1334-1, latitude 1334-2, longitude 1334-3, terminal 1334-4, service 1334-5, downlink throughput 1334-6, uplink throughput 1334-7, latency 1334-8, obstruction 1334-9, ping drop 1334-10, through signal quality 1334-N.

Returning again to FIG. 11, after presenting data features for a selected data source, a determination is made as to whether one or more data features have been selected, as in 1110. If it is determined that one or more data features have not been selected, the example process 1100 returns to block 1108 and continues. If it is determined that one or more data features have been selected, the example process 1100 determines if the data sources are to again be presented for selection, as in 1112. If it is determined that the data sources are to again be presented for selection, the example process 1100 returns to block 1104 and continues.

If it is determined that the data sources are not to again be presented for selection, data for each selected feature of each selected data source is obtained, as in 1114. For example, the example process 1100 may access each data source and obtain some or all of the data that is available for each selected feature of each selected data source. The obtained data may then be provided to the edge model, generated in accordance with the disclosed implementations, as data that is to be considered by the edge model, as in 1116. Finally, the workspace is generated and interaction with the workspace is allowed, as in 1118.

Figure 14:
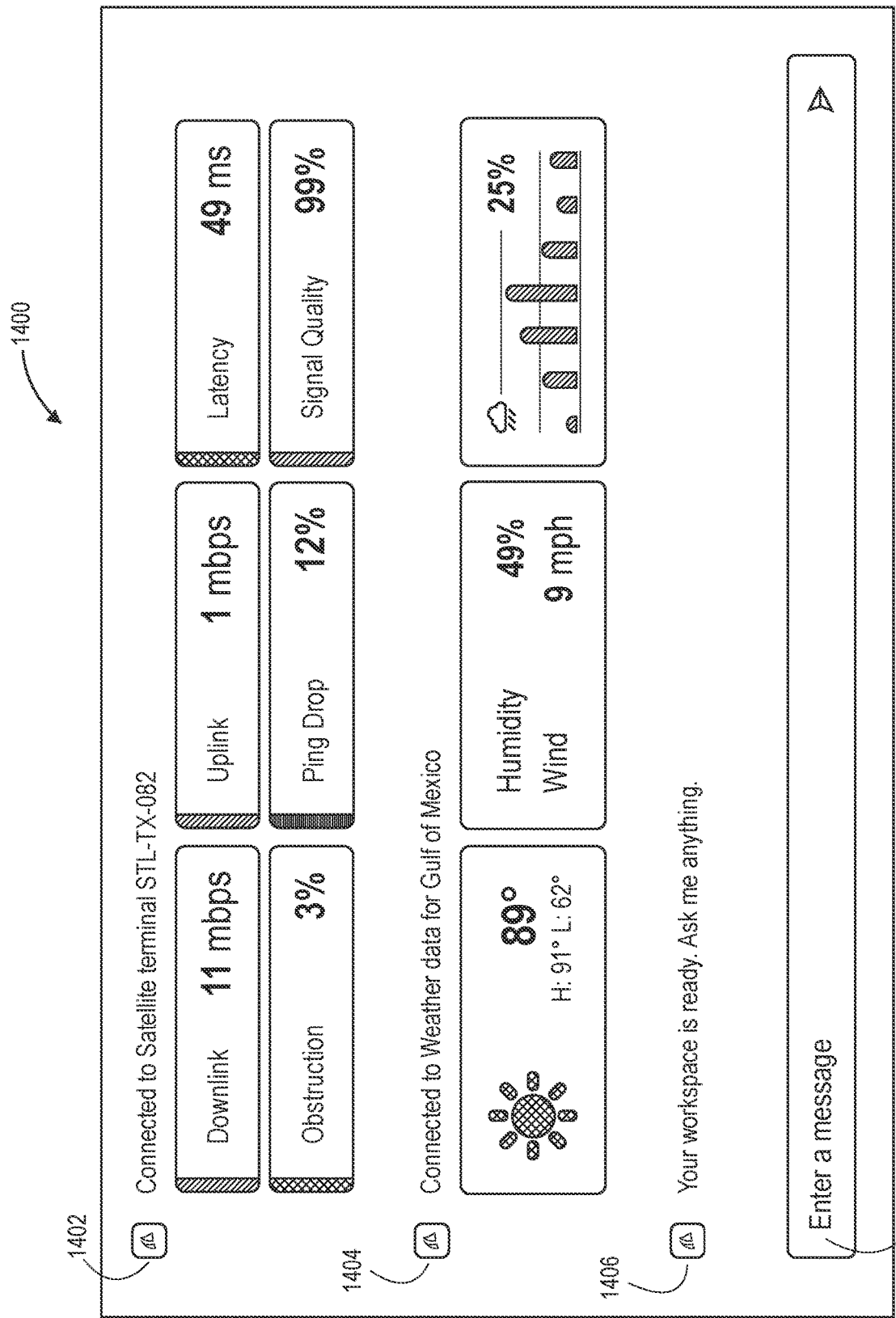
FIG. 14 is an example workspace dashboard indicating data from selected data sources and an interaction prompt, in accordance with disclosed implementations.

FIG. 14 is an example workspace dashboard 1400 indicating data from selected data sources and an interaction prompt, in accordance with disclosed implementations.

Continuing with the above example in which the operator has selected the data sources of weather 1312-1 and satellite telemetry 1312-2, the edge model may process data from the data features selected for each of those data sources and provide data relevant to each data source, along with an indication that the workspace is connected to the data source and that interaction with the workspace is ready 1406. For example, the interface 1400 may provide an indication that satellite data source 1402 and the weather data source 1404 are connected to the workspace, along with data relevant to each data source. Additionally, as discussed herein, the disclosed implementations enable natural language interaction with the workspace through the interaction control 1401. While the example interface 1400 illustrates text-based interaction, such as through a keyboard input, any of a variety of natural language inputs may be received. For example, the disclosed implementations may receive text-based input, audio-based input, haptic-based input, visual-based input, etc.

Figure 15:
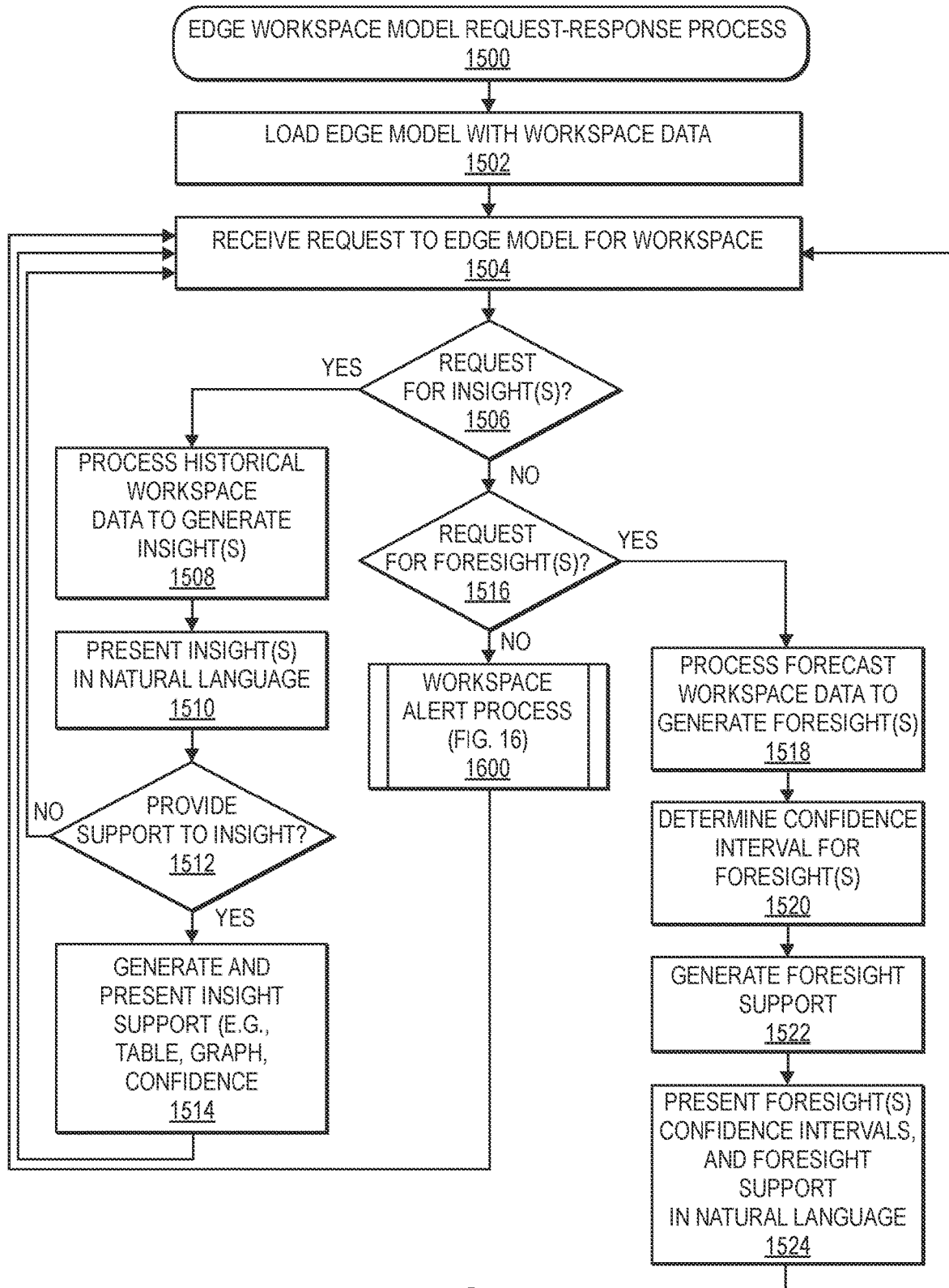
FIG. 15 is an example edge workspace model request-response process, in accordance with disclosed implementations.

FIG. 15 is an example edge workspace model request-response process 1500, in accordance with disclosed implementations. The example process 1500 may be utilized at an edge location to generate a workspace that interacts with the edge model, generated in accordance with the disclosed implementations, to provide foresights and insights that are specific to the edge location.

The example process 1500 begins by loading the edge model with data from data sources selected for a workspace, as in 1502, referred to herein as "workspace data." The data from data sources selected for the workspace may include both historical data that is maintained for the data source and/or predicted data. Likewise, in some implementations the data from each data source selected for the location may be further limited to data features of the data source. As discussed above with respect to FIGS. 11-13C a workspace may be generated and specific data sources and specific data features within each data source may be selected for use with a workspace.

After loading the data that has been selected for the workspace, a request may be received by the edge model for that workspace, as in 1504. A request that is specific for a workspace may be generated from a variety of sources. For example, the request may be input to the workspace by an operator, the request may be a defined request, such as a report generation request, the request may be an alert monitoring request, etc.

Upon receipt of the request, a determination is made as to whether the request is a request for an insight(s), as in 1506. As discussed herein, an insight is based on data representative of events or activities that have already occurred (historical data).

If it is determined that the request is for an insight, the historical workspace data is processed by the edge model to determine relationships and other information relevant to the received request and to generate one or more insights that are responsive to the request, as in 1508. The insight(s) may then be presented, as in 1510. As discussed herein, the insights may be presented in a variety of manners. For example, insights may be generated as a natural language text output, a natural language audio output, a haptic output, etc.

Figure 17A:
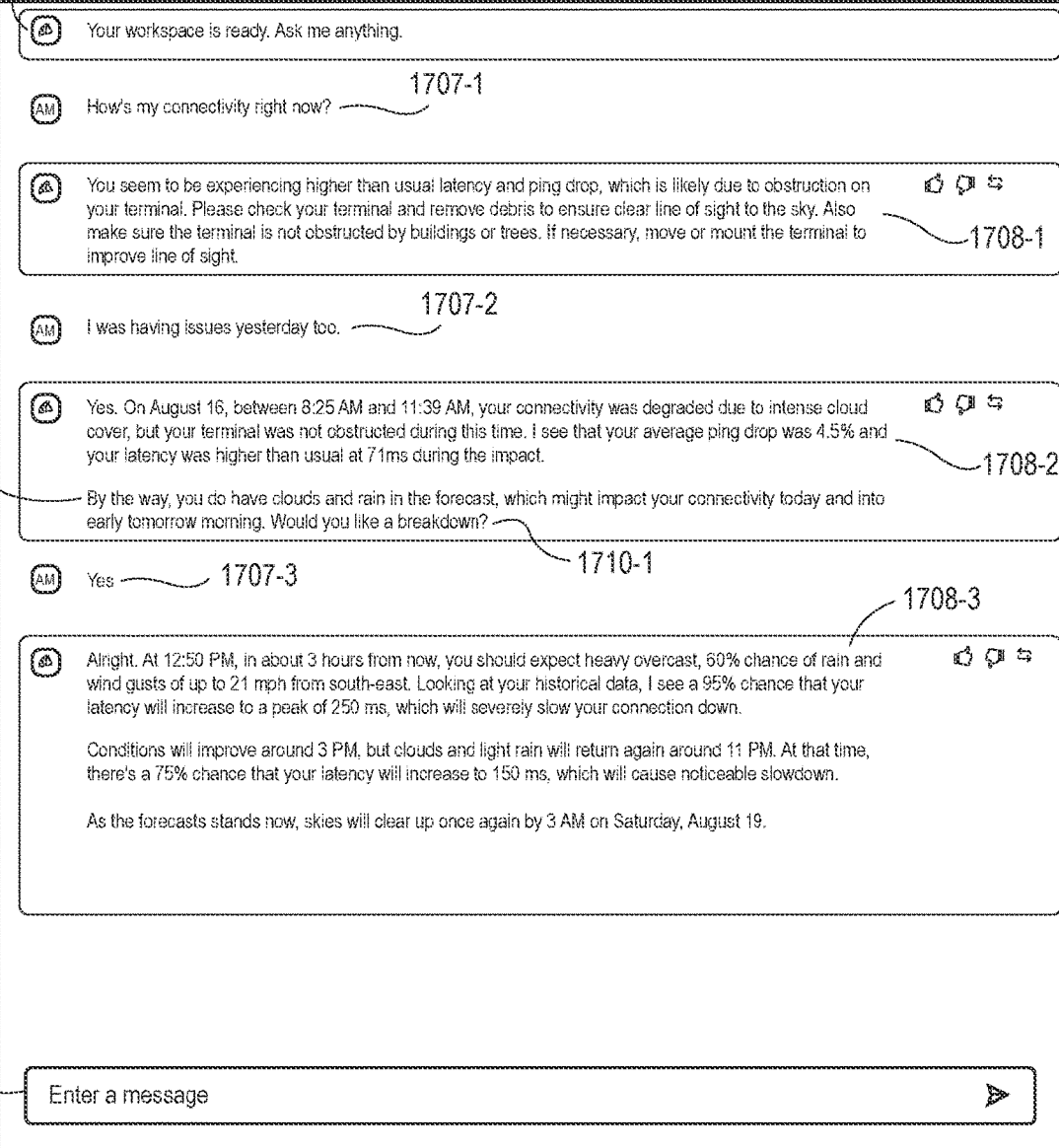
FIGS. 17A and 17B are illustrations of a natural language interaction with a workspace, in accordance with disclosed implementations.
Figure 17B:
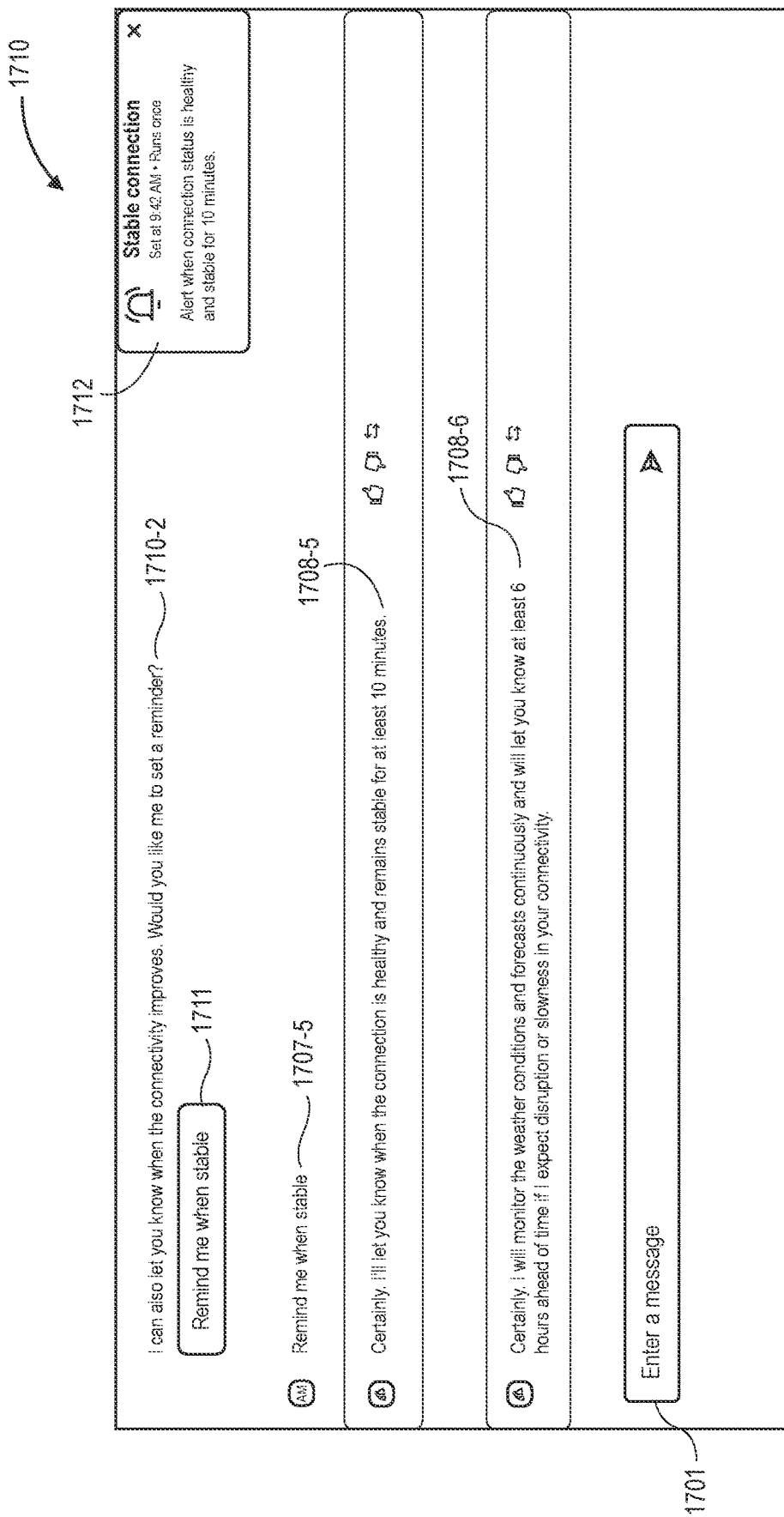

For example, FIGS. 17A and 17B are illustrations of a natural language interaction with a workspace 1700/1710, in accordance with disclosed implementations.

As illustrated, the workspace 1700/1710 may be used to present natural language responses generated by the edge model and to receive natural language inputs from an operator, thereby providing a natural and intuitive conversational interaction between the edge model and the operator.

Referring first to FIG. 17A, once data for the workspace is loaded into the edge model, the workspace may present an initial indication 1706 that it is ready to receive a request from an operator. In the illustrated example, the operator has provided an input request of "How's my connectivity right now?" 1707-1. The edge model, upon receipt of the request 1707-1 may process the request, determine based on the edge location and the workspace data that the request is a request for an insight and generate/present an insight response that is determined based on historical workspace data. In this example, the edge model, upon processing the historical workspace data, generates and provides the natural language insight 1708-1 of "You seem to be experiencing higher than usual latency and ping drop, which is likely due to obstruction on your terminal. Please check you terminal and remove debris to ensure clear line of sight to the sky. Also make sure the terminal is not obstructed by buildings or trees. If necessary, move or mount the terminal to improve line of sight." As illustrated, the determined and generated/presented insights go beyond just output of historical data relevant to a request but, through analysis of the historical data, the disclosed implementations are able to determine relationships and/or correlations between different sources of the data and, based on the training of the edge model, determine likely events or activities that may be causing the historical data and provide insights as to why the historical data is what it is and/or how to possibly alter the situation going forward (e.g., "Please check you terminal and remove debris to ensure clear line of sight to the sky. Also make sure the terminal is not obstructed by buildings or trees. If necessary, move or mount the terminal to improve line of sight.").

As illustrated in FIG. 17A, the operator may continue to interact with the edge model through the workspace 1700 as if they were having a natural language conversation. Continuing with the above example, after receiving the initial insight 1708-1, the operator may submit a follow-up, or second request 1707-2, such as "I was having issues yesterday too." Not only can the disclosed implementations process and respond to the request 1707-2 based on the workspace data, the edge model also considers the context in which the request is received. For example, a session may be maintained and prior requests and responses (insights/foresights) may be considered to provide context to the request. In this example, the context of the request of "I was having issues yesterday too" can be determined from the prior request 1707-1 which indicates the natural language conversation of the session relates to connectivity between the edge location and a satellite.

In responding to the second request 1707-2, the edge model processes the request, the workspace data relevant to the workspace and the request, and the context determined from the workspace session, and provides an insight response 1708-2 which, in this example includes "Yes. On August 16, between 8:25 AM and 11:39 AM, your connectivity was degraded due to intense cloud cover, but your terminal was not obstructed during this time. I see that your average ping drop was 4.5% and your latency was higher than usual at 71 ms during the impact."

Still further, the edge model may provide foresights and/or other prompts back to the operator as part of the session. For example, the edge model, having determined the context of the session may, in addition to providing insights that are responsive to received requests, may provide foresights relating to the session. In this example, because the context is determined to relate to connectivity between the edge location and the satellite, the edge model may also consider foresight workspace data and provide a foresight response 1709-1, such as "By the way, you do have clouds and rain in the forecast, which might impact your connectivity today and into the early morning tomorrow." As part of that response, the edge model may also be configured to ask follow-up questions to the operator, such as the question 1710-1 "Would you like a breakdown?"

As part of the session conversation, the operator may respond to the follow-up question 1710-1, in this example with a simple "Yes" response 1707-3. As a result of the operators response to a follow-up question, the edge model may treat the response and the follow-up question 1710-1 as another request, further process the foresight workspace data selected for the workspace and relevant to the request, and provide an addition response. In this example the additional response 1708-3 are the details of the forecast, again provided in a natural language response of "Alright. At 12:50 PM, in about 3 hours from now, you should expect heavy overcast, 60% chance of rain and wind gusts of up to 21 mph from south-east. Looking at your historical data, I see a 95% chance that your latency will increase to a peak of 250 ms, which will severely slow your connection down. Conditions will improve around 3 PM, but clouds and light rain will return again around 11 PM. At that time, there's a 75% chance that your latency will increase to 150 ms, which will cause noticeable slowdown. As the forecasts stands now, skies will clear up once again by 3 AM on Saturday, August 19. I'm happy to alert you if anything changes. Let me know."

In addition to providing further details, which may include insights and foresights, as part of the session conversation, the edge model, through the workspace, may also proactively ask if alerts, reports, etc., that relate to the context of the session, should be generated. For example, and continuing with the above, the edge model may proactively ask through a response 1710-2 if the operator would like to generate an alert relevant to the context of the session, such as "I can also let you know when connectivity improves. Would you like to set a reminder?" (FIG. 17B) Still further, the workspace may present a control 1711 that the operator may select that will cause the alert to be generated.

The operator may select the control 1711 or simply respond to the request with an additional input, such as "Remind me when stable." 1707-5. An alert, such as remind me when a stable connection is established for at least ten minutes, may then be generated in response to the operator selecting the control 1711 or providing an affirmative request 1707-5. The edge model, through the workspace, in response to receiving the request for an alert, may provide a response confirming that the request has been received and what the alert entails. In this example, the response 1708-5 from the edge model, again presented in natural language, may state "Certainly. I'll let you know when the connection is healthy and remains stable for at least 10 minutes." When the threshold or other monitored conditions of the alert are satisfied, an alert notification 1712 may be presented via the workspace and/or through other channels (e.g., mobile device notification) notifying the operator that the conditions of the alert have been satisfied.

Generation and monitoring of an alert by the edge model is discussed further below with respect to FIG. 16.

Returning to FIG. 15, after presenting the insight through the workspace, the example process 1500 may determine if additional support for the insight is to be provided, as in 1512. In some implementations, additional support may be provided for any response that includes an insight. In other implementations, it may be determined that additional support is to be provided if the operator asks for additional details, submits a related follow-up request, etc. In still other examples, as part of the session communication, the edge model may inquire as to whether additional support is desired.

If it is determined that additional support is not to be provided, the example process 1700 returns to block 1504 and continues. If it is determined that additional support is to be provided, additional support is generated and presented through the workspace, as in 1514. As discussed below, additional support may be presented as natural language, such as the additional support included in the response 1708-3 (FIG. 17A), may be provided graphically, as discussed below with respect to FIG. 17C, etc.

Returning to decision block 1506, if it is determined that the request is not a request for insights, a determination is made as to whether the request is a request for foresights, as in 1516. If it is determined that the request is a request for one or more foresights, the example process 1500, through the edge model, processes forecasted workspace data to generate one or more foresights that are responsive to the request, as in 1518. In addition, one or more confidence intervals for the one or more foresights may be determined to indicate the confidence of the generated foresight, as in 1520. For example, a statistical analysis of the data used to generate the foresight and the strength of correlations between different sources of data, which may be determined from training or ongoing knowledge/learning of the data, may be utilized to determine the confidence interval(s). Based on the generated foresight(s) and confidence interval(s) foresight support is generated, as in 1522, that includes supporting data for the foresight(s). Foresight support may include textual, graphical, etc., presentation of data that provides operator discernable support for the generated foresight. Finally, the foresight(s), confidence interval(s), and foresight support (e.g., graphs, table, etc.) is presented in a natural language via the workspace, as in 1524, and the example process 1500 returns to block 1504 and continues.

Returning to decision block 1516, if it is determined that the request is not a request for a foresight, the workspace alert process 1600 (FIG. 16) is performed to generate an alert in response to the request.

Figure 16:
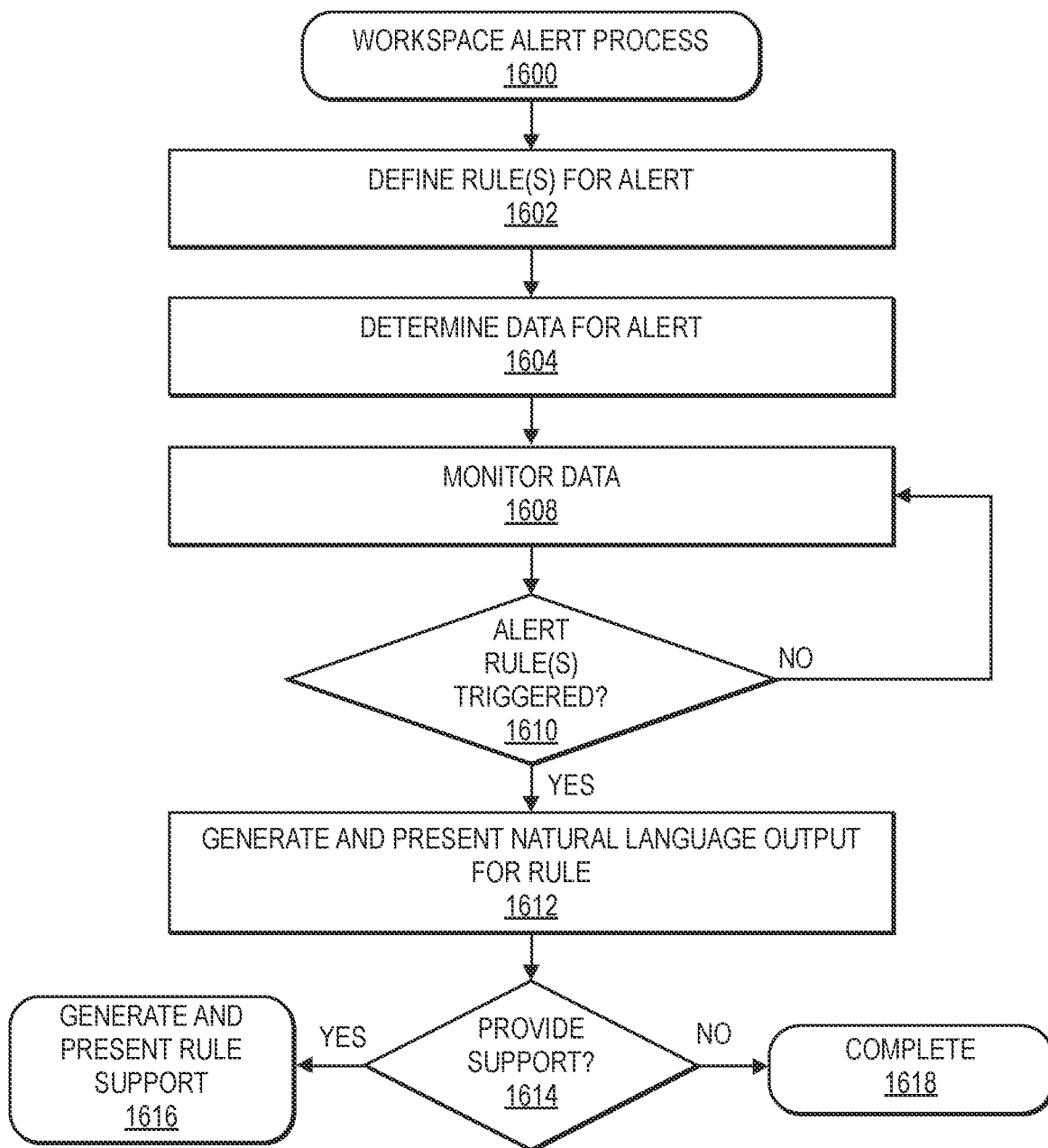
FIG. 16 is an example workspace alert process, in accordance with disclosed implementations.

FIG. 16 is an example workspace alert process 1600, in accordance with disclosed implementations. The example process 1600 may be performed anytime a request for an alert is created, anytime it is determined that alert is to be created, etc. In some implementations, an alert may be specific to a workspace and the data source(s) selected for that workspace, specific to the edge location, etc.

The example process begins by defining one or more rules for the alert, as in 1602. The rules may be determined based on the alert that is being created. For example, and referring to the above example discussion for a stable connection alert (FIG. 17B), the rule may be to trigger the alert when the connection status is healthy and stable for ten minutes. Any number and/or type of rules may be created for an alert and alerts/rules may be relevant to any one or more data sources.

In addition to determining the rule(s) for the alert, the data that is to be monitored for the alert is also determined, as in 1604. In some implementations, the data may be specific to a data source that is accessible by a workspace for which the alert is being generated. In other examples, the data may be any data source that is generated by or accessible from the edge location.

The data determined for the alert may then be monitored, as in 1608, and a determination made as to whether the rule(s) has been satisfied, as in 1610. If it is determined that the rule(s) has not been satisfied, the example process 1600 returns to block 1608 and continues. If it is determined that the rule(s) has been satisfied, a natural language output that provides a notification that the alert has been triggered is generated and presented, as in 1612. As discussed above, any of a variety of natural language outputs may be generated and used to communicate the satisfaction of the alert. In addition, a determination may be made as to whether support for the alert is to be provided, as in 1614. In some implementations, support may always be provided when an alert is triggered. In other implementations, support may be automatically provided for foresight based alerts but not insight based alerts, or support may only be provided when requested, etc. If it is determined that support is not to be provided, the example process 1600 completes, as in 1618. If it is determined that support is to be provided, support (e.g., graph, table, confidence interval, etc.) is generated and presented with the alert notification, as in 1616. Support may be generated based on the data that was monitored and determined to satisfy the rule(s) of the alert and may be provided as natural language output, as a graphical output, etc.

Figure 17C:
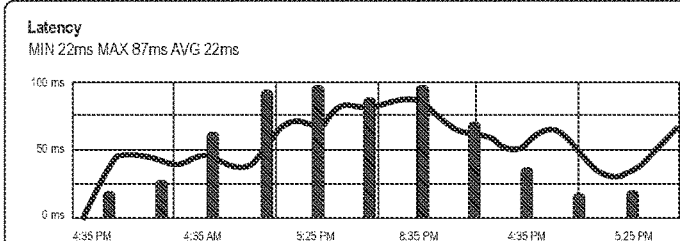
FIG. 17C is an illustration of a natural language interaction with a workspace and generated support, in accordance with disclosed implementations.

FIG. 17C is an illustration 1720 of a natural language interaction with a workspace and generated support, in accordance with disclosed implementations.

In the illustrated example, the operator submits a request 1707-7 indicating that the operator is requesting a summary report of connectivity status over the last 24 hours and that the report include graphs (or charts) showing reasons why the connection was spotty. In this example, the natural language request 1707-7 states "Since I've already missed the report deadline for today, can you put together a summary report of my connectivity status over the last 24 hours, so I can explain to HQ what happened. Include some charts showing weather or any other reasons why my connection was spotty."

In response to the request 1707-7, the edge model processes the historical workspace data relevant to weather and connectivity which, as discussed above, may be obtained from two different data sources, and generates a response 1714 in the form of a summary report. In the illustrated example, processing of the data determines time periods during the last 24 hours in which connectivity between the edge location and the satellite was degraded, along with supporting metrics. The response 1714, presented in the form of a summary report includes, for example, "Satellite terminal STL-TX-082 experienced degraded performance in the following periods: Thursday August 17, 8:00 PM to 11:28 PM, due to cloud cover, wind, and rain. Friday, August 18, 1:19 AM to 3:32 AM, due to terminal obstruction."

As illustrated from the natural language presentation of the response 1714, the edge model determined the relationship between two different data sources. Namely, the edge model determined that the cause of the degraded experience, which is determined from the connectivity data source, was poor weather conditions (cloud cover, wind, and rain), which is determined from the weather data source.

In addition, the response 1714 includes several graphical outputs 1716-1, 1716-2, 1716-3, 1716-4, 1716-5, 1716-6, and 1716-7. As discussed above, the edge model may be trained to generate text-based graph descriptions that may be utilized to generate a graph, such as graphs 1716-1 through 1716-7. For example, a generated text-based graph description may be provided to a graphing model, such as MATPLOTLIB, to generate the graphs 1716-1 through 1716-7 that are provided as support. In the illustrated example, a downlink throughput chart 1716-1, an uplink throughput chart 1716-2, a latency chart 1716-3, an obstruction chart 1716-4, a ping drop chart 1716-5, and a signal quality chart 1716-6 may be generated from historical data collected during the last 24 hours in the connectivity data source. In addition, the latency to cloud cover chart 1716-7, which may be generated based on a combination of the historical latency data obtained from the connectivity data source and the cloud cover data obtained from the weather data source may be generated for the same period of time to illustrate the impact cloud cover has on latency of a connection.

While the above examples focus primarily on generating foresights and insights based on data local to the edge location at which the edge model is deployed and/or based on data received at the edge location (e.g., weather data), the disclosed implementations may also utilize data from multiple edge locations. For example, the edge model may be deployed to a first edge location that is in constant, periodic, or intermittent communication with one or more other edge locations and those other edge locations may provide time-based data to the edge model deployed at the first location each time they are in communication with the first edge location/edge model. In such an example, the edge model may generate insights and/or foresights for the first edge location, each of the one or more other edge locations, and/or generate insights and/or foresights for all of the communicating edge locations collectively. For example, if the edge model receives data from five different edge locations, the edge model may utilize that data collectively to provide insights and foresights that are relevant to one or more of those five locations.

As will be appreciated, any number and/or types of charts or other supporting information may be generated and presented in accordance with the disclosed implementations and those discussed herein are provided only as examples.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some, or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
    time-aligning data from a plurality of sources to produce a tabular data set of the time-aligned data;
    determining a plurality of statistical terms to compute from the time-aligned data;
    generating a plurality of summary statistics that includes a statistical computation for each of the plurality of statistical terms, computed based at least in part on at least a portion of the time-aligned data;
    generating a plurality of rule-based prompts, the plurality of rule-based prompts including at least one rule-based prompt for each statistical term of the plurality of statistical terms, wherein the rule-based prompt generated for each statistical term includes a natural language description that corresponds to the statistical term and a summary statistic determined for the statistical term;
    providing the plurality of rule-based prompts and the plurality of summary statistics to a first machine learning model with instructions for the first machine learning model to generate a plurality of natural language summary statistics, the plurality of natural language summary statistics including at least one natural language statistical summary for each statistical term of the plurality of statistical terms;
    for each of the plurality of natural language summary statistics, generating, with the first machine learning model, a plurality of permutations of the natural language summary statistic to increase a total number of the plurality of natural language summary statistics;
    generating a plurality of instruction-output ("IO") pairs, the plurality of IO pairs including an IO pair for each of the plurality of natural language summary statistics;
    for each IO pair, generating, with the first machine learning model and based at least in part on one or more of the tabular data, summary statistics, the natural language summary statistics, and the IO pair, a plurality of IO pair permutations for the IO pair;

generating training data that includes at least the plurality of IO pairs and the plurality of IO pair permutations;

training, with the training data, a second machine learning model that is different than the first machine learning model, wherein the training includes training the second machine learning model to receive a text input and provide, as a response to the text input, a natural language statistical summary of the plurality of natural language summary statistics based at least in part on statistical data determined from time-series data received by the second machine learning model; and deploying the second machine learning model at an edge location.

2. The computer-implemented method of claim 1, further comprising:

transmitting, from a first location to the edge location that includes the second machine learning model, at least a portion of the training data; and training the second machine learning model at the edge location.

3. The computer-implemented method of claim 1, further comprising:

training the second machine learning model to generate, based at least in part on actual time-series data generated or received at the edge location that includes the second machine learning model, insights that provide statistical relationships between a first item of the actual time-series data and a second item of the actual time-series data.

4. The computer-implemented method of claim 1, further comprising:

receiving, with the second machine learning model, a request; and providing, in response to the request, a first natural language statistical summary of the plurality of natural language summary statistics that includes statistical data determined from time-series data received by the second machine learning model.

5. The computer-implemented method of claim 4, wherein the request is at least one of:

an insight request for an insight that is determinable from actual data generated at the edge location that includes the second machine learning model or actual data received by the second machine learning model;

a foresight request for a statistical probability of an event occurring that is determinable from forecast data generated at the edge location or forecast data received by the second machine learning model; or an alert request to monitor at least one of the actual data or the forecast data for an actual or predicted occurrence of the event.

6. The computer-implemented method of claim 1, further comprising:

generating a workspace at the edge location;

receiving a selection of at least one data source from a plurality of available data sources;

providing data from the at least one data source to the second machine learning model;

receiving a request at the workspace, wherein the request is provided in a natural language;

generating, with the second machine learning model, based at least in part on data from the at least one data source, and in response to the request, a natural language response to the request; and presenting, through the workspace, the natural language response.

7. A computing system, comprising:

one or more processors; and a memory storing program instructions that, when executed by the one or more processors, cause the one or more processors to at least:

produce a tabular data set of time-aligned data;

generate a plurality of rule-based prompts, the plurality of rule-based prompts including prompts corresponding to a statistical term of a plurality of statistical terms, wherein the rule-based prompt generated for each statistical term includes a natural language description that corresponds to the statistical term and a summary statistic determined for the statistical term;

provide the plurality of rule-based prompts and the tabular data to a first machine learning model with instructions for the first machine learning model to generate a plurality of natural language summary statistics, the plurality of natural language summary statistics including at least one natural language statistical summary for each statistical term of the plurality of statistical terms;

for each of the plurality of natural language summary statistics, generate, with the first machine learning model, a plurality of permutations of the natural language summary statistic to increase a total number of the plurality of natural language summary statistics;

generate a plurality of instruction-output ("IO") pairs, the plurality of IO pairs including an IO pair for each of the plurality of natural language summary statistics;

for each IO pair, generate, with the first machine learning model and based at least in part on one or more of the tabular data, summary statistics, the natural language summary statistics, and the IO pair, a plurality of IO pair permutations for the IO pair;

generate training data that includes at least the plurality of IO pairs and the plurality of IO pair permutations;

train, with the training data, a second machine learning model that is different than the first machine learning model, wherein the training includes training the second machine learning model to receive a text input and provide, as a response to the text input, a natural language statistical summary based at least in part on the plurality of natural language summary statistics that includes statistical data determined from time-series data received by the second machine learning model; and deploy the second machine learning model at an edge location.

8. The computing system of claim 7, wherein the program instructions that, when executed by the one or more processors, further include instructions that cause the one or more processors to at least:

generate a plurality of summary statistics that includes a statistical computation for each of the plurality of statistical terms, computed based at least in part on at least a portion of the time-aligned data; and wherein the plurality of summary statistics are provided to the first machine learning model with the plurality of rule-based prompts and the tabular data.

9. The computing system of claim 7, wherein the program instructions that, when executed by the one or more processors, further include instructions that cause the one or more processors to at least:
train the second machine learning model at a first location; and
transfer the second machine learning model from the first location to the edge location, wherein the edge location is different than the first location.

10. The computing system of claim 7, wherein the program instructions that, when executed by the one or more processors, further include instructions that cause the one or more processors to at least:
train the second machine learning model to generate, based at least in part on actual time-series data generated or received at the edge location that includes the second machine learning model, insights that provide statistical relationships between a first item of the actual time-series data and a second item of the actual time-series data.

11. The computing system of claim 10, wherein the program instructions that, when executed by the one or more processors, further include instructions that cause the one or more processors to at least:
train the second machine learning model to generate a text-based graph description that supports the insights, wherein the text-based graph description is useable to generate a graph as part of an output.

12. The computing system of claim 7, wherein the program instructions that, when executed by the one or more processors, further include instructions that cause the one or more processors to at least:
receive, with the second machine learning model, a request; and
provide, in response to the request, a first natural language statistical summary based at least in part on the plurality of natural language summary statistics that includes statistical data determined from time-series data received by the second machine learning model.

13. The computing system of claim 12, wherein the request is at least one of:
an insight request for an insight that is determinable from actual data generated at the edge location or actual data received at the edge location;
a foresight request for a statistical probability of an event occurring that is determinable from forecast data generated at the edge location or forecast data received at the edge location;
a confidence interval of the statistical probability;
a first graph request for a first graphical representation of the insight;
a second graph request for a second graphical representation of a foresight;
a report request to generate a report based at least in part on one or more of the actual data or the forecast data; or
an alert request to monitor at least one of the actual data or the forecast data for an actual or predicted occurrence of the event.

14. The computing system of claim 7, wherein the program instructions, that when executed by the one or more processors, further cause the one or more processors to at least:
tune the second machine learning model based at least in part on data received or generated at the edge location.

15. The computing system of claim 7,
wherein the program instructions that, when executed by the one or more processors, further cause the one or more processors to at least produce text-based graph descriptions; and
wherein the program instruction that cause the one or more processors to generate the plurality of rule-based prompts further include prompts corresponding to the text-based graph descriptions.

16. The computing system of claim 7, wherein at least some of the tabular data is synthetically generated.

17. A method, comprising:
generating a plurality of summary statistics that includes a statistical computation for each of a plurality of statistical terms;
generating a plurality of rule-based prompts, the plurality of rule-based prompts including at least one rule-based prompt for each statistical term of the plurality of statistical terms, wherein the rule-based prompt generated for each statistical term includes a natural language description that corresponds to the statistical term and a summary statistic determined for the statistical term;
generating, with a first machine learning model and based at least in part on the plurality of summary statistics, a plurality of natural language summary statistics, the plurality of natural language summary statistics including at least one natural language statistical summary for each statistical term of the plurality of statistical terms;
for each of the plurality of natural language summary statistics, generating, with the first machine learning model, a plurality of permutations of the natural language summary statistic to increase a total number of the plurality of natural language summary statistics;
generating a plurality of instruction-output ("IO") pairs, the plurality of IO pairs including an IO pair for each of the plurality of natural language summary statistics;
for each IO pair, generating, with the first machine learning model and based at least in part on one or more of the summary statistics, the natural language summary statistics, and the IO pair, a plurality of IO pair permutations for the IO pair;
generating training data that includes at least the plurality of IO pairs and the plurality of IO pair permutations; and
training, with the training data, a second machine learning model that is different than the first machine learning model, wherein the training includes training the second machine learning model to receive a text input and provide, as a response to the text input, a natural language statistical summary based on the plurality of natural language summary statistics that includes statistical data determined from time-series data received by the second machine learning model.

18. The method of claim 17, wherein each of the plurality of summary statistics are computed based at least in part on at least a portion of a time-aligned tabular data.

19. The method of claim 17, further comprising:
receiving, with the second machine learning model, a request; and
providing, in response to the request, a first natural language statistical summary of the plurality of natural language summary statistics that includes statistical data determined from time-series data received by the second machine learning model.

20. The method of claim 17, wherein the response includes at least one of:

a diagnostic insight that illustrates what might have happened based on a historical data of an edge location;
a descriptive insight that illustrates what has already happened based on the historical data;
a predictive foresight that illustrates what could happen based on a forecasted data or a predicted data; and
a prescriptive foresight that illustrates what should happen based on the forecasted data or predicted data.

* * * * *